US009002140B2

(12) United States Patent
Ohki et al.

(10) Patent No.: US 9,002,140 B2
(45) Date of Patent: Apr. 7, 2015

(54) IMAGE PROCESSING APPARATUS, METHOD, AND PROGRAM

(71) Applicant: Sony Corporation, Tokyo (JP)

(72) Inventors: Mitsuharu Ohki, Tokyo (JP); Hideshi Yamada, Kanagawa (JP); Kenichi Sano, Tokyo (JP)

(73) Assignee: Sony Corporation, Tokyo (JP)

( * ) Notice: Subject to any disclaimer, the term of this patent is extended or adjusted under 35 U.S.C. 154(b) by 67 days.

(21) Appl. No.: 13/783,995

(22) Filed: Mar. 4, 2013

(65) Prior Publication Data

US 2013/0259401 A1 Oct. 3, 2013

(30) Foreign Application Priority Data

Mar. 28, 2012 (JP) ................................. 2012-072788

(51) Int. Cl.
*G06K 9/36* (2006.01)
*G06T 11/60* (2006.01)

(52) U.S. Cl.
CPC ...................................... *G06T 11/60* (2013.01)

(58) Field of Classification Search
USPC ................. 382/103, 173, 190, 284
See application file for complete search history.

(56) References Cited

U.S. PATENT DOCUMENTS 8,300,890 B1 * 10/2012 Gaikwad et al. .............. 382/103

FOREIGN PATENT DOCUMENTS

| JP | 2003-274263 A | 9/2003 |
| JP | 2011-138313 A | 7/2011 |
| JP | 2011-139288 A | 7/2011 |

* cited by examiner

*Primary Examiner* — Duy M Dang
(74) *Attorney, Agent, or Firm* — Wolf, Greenfield & Sacks, P.C.

(57) ABSTRACT

There is provided an image processing apparatus that combines a first photographed image including a first foreground object and a background with a second photographed image including a second foreground object and the background, and generates an output image including the first foreground object, the second foreground object, and the background, the image processing apparatus including a seam candidate region determining unit that determines a seam candidate region obtained by removing regions of the first foreground object and the second foreground object from the first photographed image or the second photographed image, a seam determining unit that determines a seam which passes through a top edge and a bottom edge of the seam candidate region and divides the seam candidate region, and a combining unit that combines the first photographed image and the second photographed image at the seam to generate the output image.

7 Claims, 24 Drawing Sheets

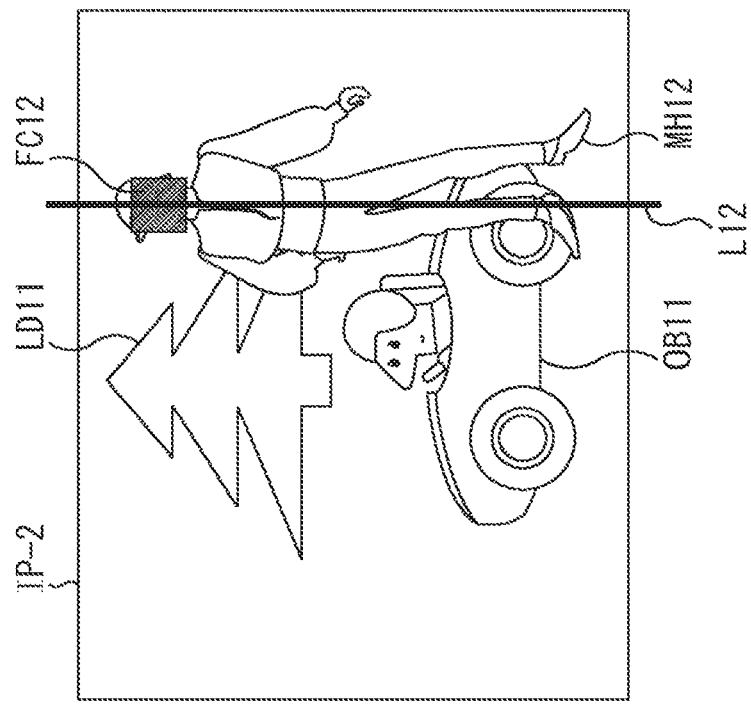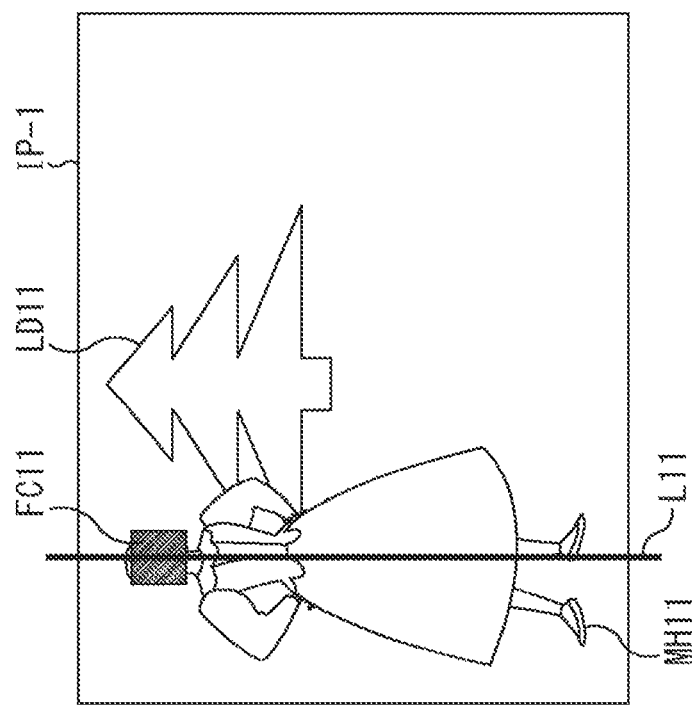

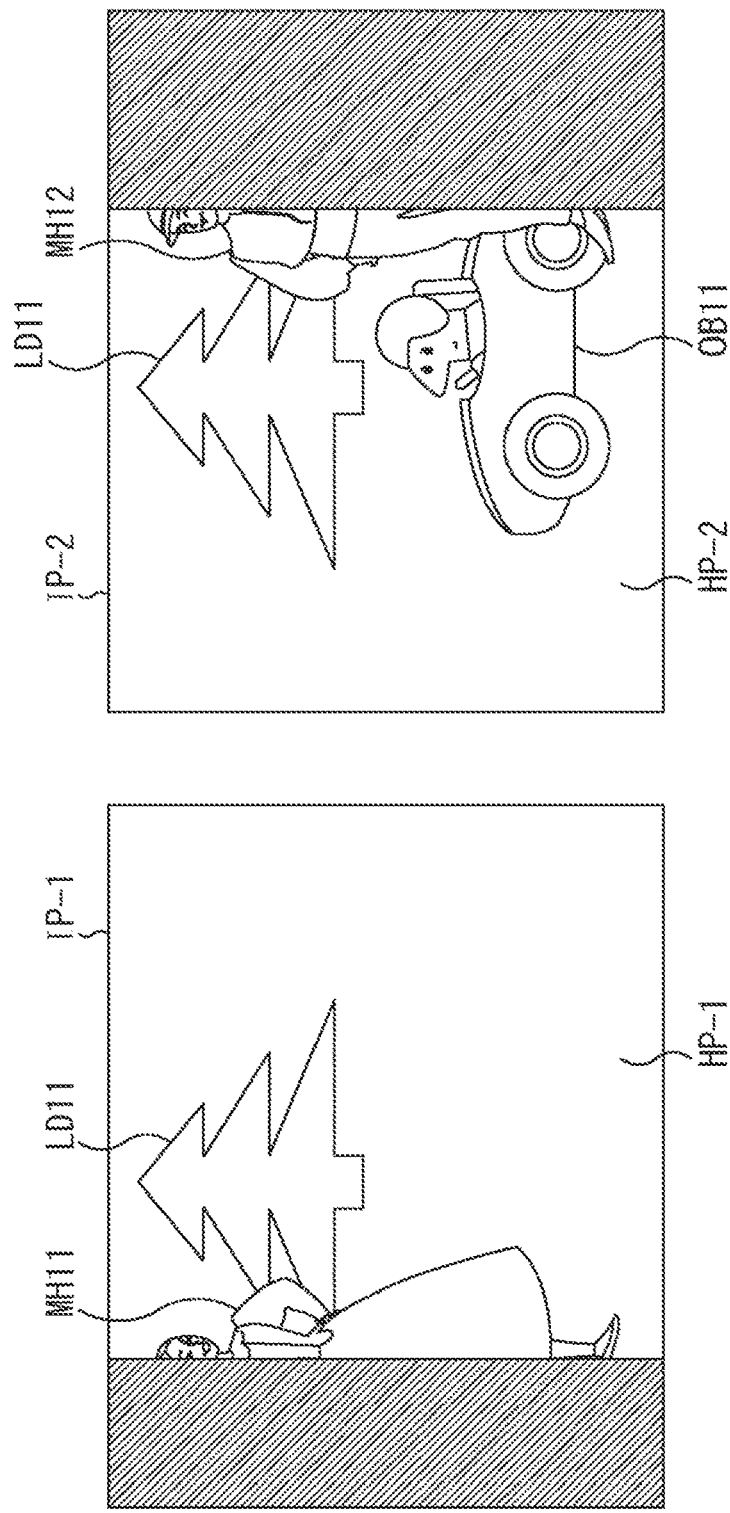

IMAGE PROCESSING APPARATUS, METHOD, AND PROGRAM

BACKGROUND

The present technology relates to an image processing apparatus, method, and program, and more particularly, to an image processing apparatus, method, and program enabling simpler image combining.

For example, a user may take commemorative photographs when traveling with another user as a pair. In such a case, image combining is a conceivable technique for obtaining an image capturing the two users.

In other words, the first user may first take a photograph of the second user and a landscape. Thus, a first photographed image is obtained. Subsequently, the second user may take a photograph of the first user and the landscape. Thus, a second photographed image is obtained.

By subsequently combining the first and second photographed images thus obtained, it is possible to obtain a combined image capturing the two users together with the landscape.

For example, JP 2003-274263A discloses technology for realizing such image combining. However, since the seam between the first and second photographed images is taken to be a straight line, combining images involves photographing people such that they do not overlap that line, which is inconvenient.

Accordingly, there have been proposed technologies that utilize graph cut techniques to adaptively determine the positions of a seam between photographed images (see JP 2011-138313A and JP 2011-139288A, for example.)

With such technology, regions presumed to be humans are detected from photographed images, a stronger value is set for a data parameter corresponding to the detected portions, and a smoothing parameter is additionally set according to the differential strength between two photographed images. A seam is then adaptively determined by graph cut techniques so as to minimize the sum of the data parameter and the smoothing parameter.

SUMMARY

However, with the above technology it has not been possible to suitably combine two photographed images with simple processing.

For example, with technology utilizing graph cut techniques, information such as edge information is used to detect regions presumed to be humans. However, such a detection technique is heuristic, and it can hardly be said that the detection accuracy is high. For this reason, it has been difficult to suitably compute the position of a seam between photographed images. Also, technology utilizing graph cut techniques involves the complex calculations of computing both a smoothing parameter and a data parameter, and minimizing their total energy function.

The present technology has been devised in light of such circumstances, and enables the suitable combining of images with simpler processing.

According to an embodiment of the present disclosure, there is provided an image processing apparatus that combines a first photographed image including a first foreground object and a background with a second photographed image including a second foreground object and the background, and generates an output image including the first foreground object, the second foreground object, and the background, the image processing apparatus including a seam candidate region determining unit that determines a seam candidate region obtained by removing regions of the first foreground object and the second foreground object from the first photographed image or the second photographed image, a seam determining unit that determines a seam which passes through a top edge and a bottom edge of the seam candidate region and divides the seam candidate region, and a combining unit that combines the first photographed image and the second photographed image at the seam to generate the output image.

The seam candidate region determining unit may include a foreground region determining unit that detects, as a foreground region, the region of the first foreground object or the second foreground object in the first photographed image or the second photographed image, a foreground difference calculator that calculates a difference between the foreground region in the image of one of either the first photographed image or the second photographed image, and the region in the other image corresponding to the foreground region, a threshold value determining unit that determines a threshold value on the basis of the difference calculated by the foreground difference calculator, a background difference calculator that calculates a difference between the first photographed image and the second photographed image in a region excluding the foreground region, and a threshold value processor that determines the seam candidate region on the basis of the difference calculated by the background difference calculator and the threshold value.

The threshold value processor may set, as the seam candidate region, a region obtained by subtracting a region where the difference is equal to or greater than the threshold value from the region whose difference has been calculated by the background difference calculator.

The seam candidate region determining unit may further include a center-penetrating region determining unit that determines, as a center-penetrating region, a region in the first photographed image or the second photographed image which differs from the seam candidate region, and which is positioned between the first foreground object and the second foreground object. In a case where the seam that passes through only the seam candidate region is not obtained, the seam determining unit may determine the seam under condition that the seam is allowed to pass through the center-penetrating region.

The seam determining unit may perform a region erosion process on a region in the first photographed image or the second photographed image that differ from the seam candidate region and the center-penetrating region, and in a case where a seam that passes through only the seam candidate region is not obtained, the seam determining unit may determine the seam under condition that the seam is allowed to pass through the region eroded by the region erosion process.

According to an embodiment of the present disclosure, there is provided an image processing method that combines a first photographed image including a first foreground object and a background with a second photographed image including a second foreground object and the background, and generates an output image including the first foreground object, the second foreground object, and the background, the image processing method including determining a seam candidate region obtained by removing regions of the first foreground object and the second foreground object from the first photographed image or the second photographed image, determining a seam which passes through a top edge and a bottom edge of the seam candidate region and divides the seam candidate region, and combining the first photographed image and the second photographed image at the seam to generate the output image.

According to an embodiment of the present disclosure, there is provided an image processing program that combines a first photographed image including a first foreground object and a background with a second photographed image including a second foreground object and the background, and generates an output image including the first foreground object, the second foreground object, and the background, the image processing program causing a computer to execute the processes of determining a seam candidate region obtained by removing regions of the first foreground object and the second foreground object from the first photographed image or the second photographed image, determining a seam which passes through a top edge and a bottom edge of the seam candidate region and divides the seam candidate region, and combining the first photographed image and the second photographed image at the seam to generate the output image.

According to the embodiments of the present disclosure described above, it is possible to suitably combine images with simpler processing.

BRIEF DESCRIPTION OF THE DRAWINGS

FIG. 4 is a diagram illustrating facial region dividing lines;
FIG. 5 is a diagram illustrating inter-person images.

DETAILED DESCRIPTION OF THE EMBODIMENT(S)

Figure 1:
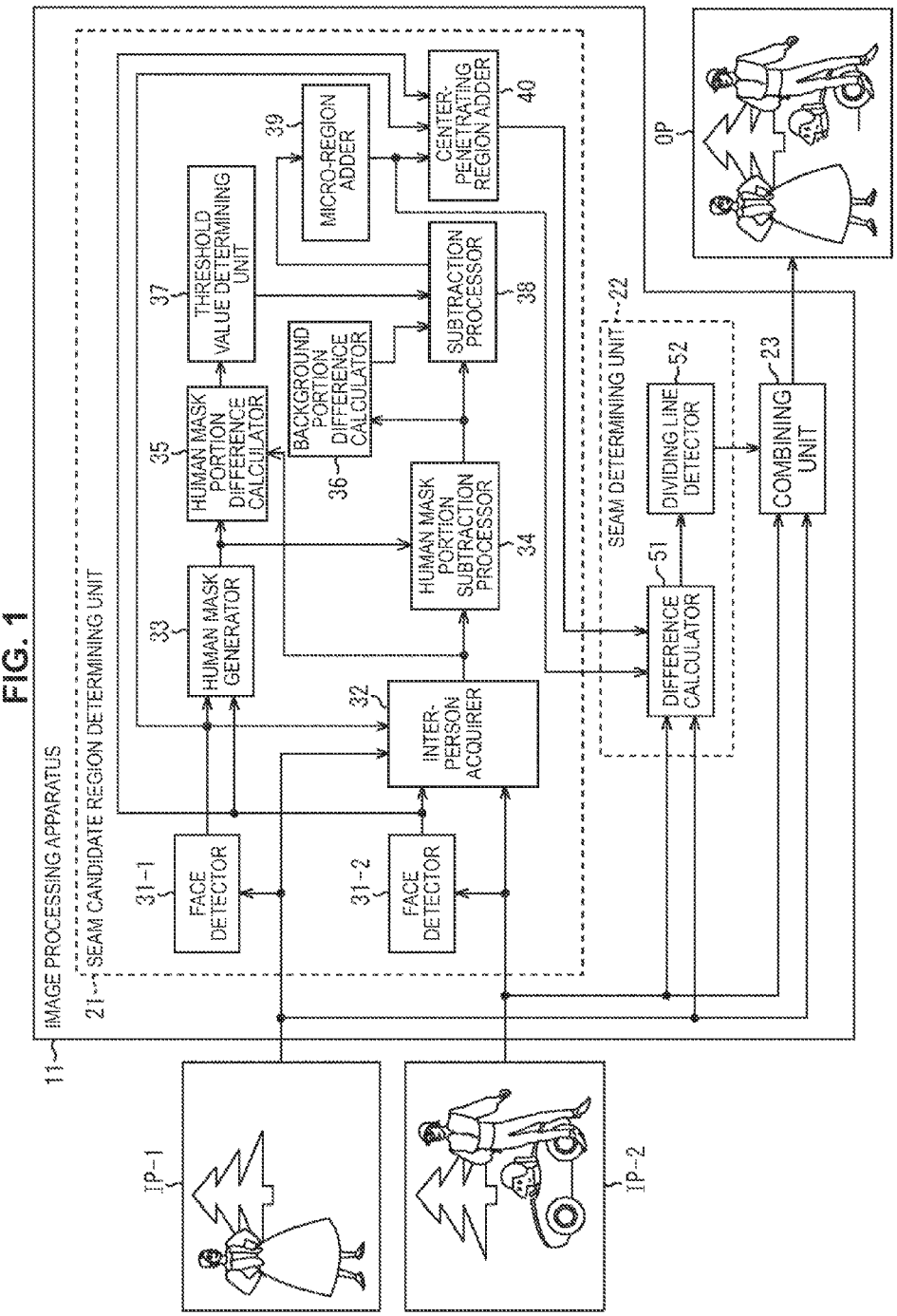
FIG. 1 is a diagram illustrating an exemplary configuration of an image processing apparatus.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

<First Exemplary Embodiment>
[Concept of Present Technology]

First, the concept of the present technology will be described.

An image combining process according to an exemplary embodiment of the present technology includes three overall steps.

In the first step, a process is performed to specify the region of portions not including a human in the first and second photographed images as a seam candidate region. If a line passing through and dividing the seam candidate region is taken to be the seam between the two photographed images, it is possible to join a first photographed image and a second photographed image without cutting through a human.

In the second step, a seam that smoothly joins the two photographed images inside the seam candidate region is determined.

Subsequently, in the third and final step, a combining process that actually joins the two photographed images at the determined seam is performed.

Thus, it is possible to combine (join) two photographed images with simple calculations and obtain a single combined image such as a commemorative photograph.

[Difference Between Present Technology and Related Art]

The difference between image combining according to the embodiment of the present technology and image combining of the related art will now be described.

The present technology differs from JP 2003-274263A in that a seam is adaptively determined with reference to differences between two photographed images. In JP 2003-274263A, the portion taken to be the seam is predetermined.

Also, paragraph 29 in JP 2011-138313A and paragraph 31 in JP 2011-139288A state that it is not possible to detect humans facing sideways or backwards with face detection techniques.

However, since the faces of the users given as subjects are typically facing forward when taking a commemorative picture, it is possible to utilize the established face detection techniques of the related art. The present technology differs from JP 2011-138313A and JP 2011-139288A in that face detection is utilized.

Also, the present technology is configured to mask portions where a human appears in a photographed image, such that the seam between the two photographed images does not pass through the masked portions. Thus, the data parameter that was necessary in the technology of the related art (a parameter indicating the likelihood of a human) is unnecessary in the present technology. This is because portions likely to be humans are masked in the present technology. Thus, it is possible to derive a desired result with the simple calculation of minimizing an energy function considering only the smoothing parameter.

[Exemplary Configuration of Image Processing Apparatus]

Next, specific exemplary embodiments applying the present technology will be described.

FIG. 1 illustrates an exemplary configuration of an exemplary embodiment of an image processing apparatus applying the present technology.

Two photographed images IP-1 and IP-2 respectively taken by two users are input into the image processing apparatus 11 in FIG. 1. These photographed images IP-1 and IP-2 are then combined in the image processing apparatus 11, and the output image OP obtained as a result is output.

Note that since the two photographed images IP-1 and IP-2 are taken by respectively different users, there is a possibility that that the shooting direction of each photographed image may differ slightly. However, shifts in the shooting direction may be addressed by aligning the photographed images. Also, since such technology for aligning photographed images is established technology, description thereof is omitted herein.

Consequently, the description hereinafter will proceed assuming that the two photographed images IP-1 and IP-2 have been taken from the same position and in the same direction. In addition, the photographed images IP-1 and IP-2 hereinafter will be designated simply the photographed images IP when no particular distinction is being made between them.

In the example in FIG. 1, the first photographed image IP-1 is an image photographed by a man taken to be the subject appearing in the second photographed image IP-2, and captures a woman and a landscape as its subject. The photographed image IP-1 captures a tree as the landscape.

Also, the second photographed image IP-2 is an image photographed by a woman taken to be the subject appearing in the first photographed image IP-1, and captures a man and a landscape as its subject. In addition to the tree captured as the landscape, the photographed image IP-2 has also captured a moving automobile as its subject.

An object of an exemplary embodiment according to the embodiment of the present technology is to obtain an output image OP using the photographed image IP-1 and the photographed image IP-2. The output image OP captures the man and the woman as its primary subject. Note that although the output image OP only captures half of the automobile in the second photographed image IP-2, this is acceptable because the automobile is not the primary subject (the man and the woman).

The image processing apparatus 11 includes a seam candidate region determining unit 21, a seam determining unit 22, and a combining unit 23.

The seam candidate region determining unit 21 determines seam candidate region, being the region in which to search for a seam between the photographed images IP, by performing a seam candidate region determining process on the basis of the supplied photographed images IP, and supplies the determination result to the seam determining unit 22. Herein, the seam candidate region determining process corresponds to the first step discussed earlier.

The seam candidate region determining unit 21 is equipped with a face detector 31-1, a face detector 31-2, an inter-person acquirer 32, a human mask generator 33, a human mask portion subtraction processor 34, a human mask portion difference calculator 35, a background portion difference calculator 36, a threshold value determining unit 37, a subtraction processor 38, a micro-region adder 39, and a center-penetrating region adder 40.

The face detector 31-1 detects the facial region of the human (person) given as the subject from the supplied photographed image IP-1, and supplies the detection result to the inter-person acquirer 32, the human mask generator 33, and the center-penetrating region adder 40.

Also, the face detector 31-2 detects the facial region of the human given as the subject from the supplied photographed image IP-2, and supplies the detection result to the inter-person acquirer 32, the human mask generator 33, and the center-penetrating region adder 40. Note that the face detector 31-1 and the face detector 31-2 hereinafter will be designated simply the face detectors 31 when no particular distinction is being made between them.

The inter-person acquirer 32 conducts an inter-person acquiring process on the basis of the supplied photographed images and the facial region detection results from the face detectors 31, and supplies inter-person images obtained as a result to the human mask portion subtraction processor 34 and the human mask portion difference calculator 35.

In the inter-person acquiring process, the region from the center of the facial region of the person given as the subject in one of the two photographed images on the side opposite the region of the person in the other photographed image is deleted (removed), and the image of the remaining region is taken to be an inter-person image. In other words, an inter-person image is an image of the region between the two users who are the primary subjects in the photographed images.

The human mask generator 33 generates human masks indicating the regions of humans given as the primary subjects in the photographed images on the basis of the facial region detection results supplied from the face detectors 31, and supplies the generated human masks to the human mask portion subtraction processor 34 and the human mask portion difference calculator 35.

The human mask portion subtraction processor 34 generates a human region-subtracted image on the basis of the inter-person images from the inter-person acquirer 32 and the human masks from the human mask generator 33, and supplies the generated human region-subtracted image to the background portion difference calculator 36 and the subtraction processor 38. Herein, a human region-subtracted image is an image obtained by removing the regions of the human masks from the inter-person images.

On the basis of the inter-person images from the inter-person acquirer 32 and the human masks from the human mask generator 33, the human mask portion difference calculator 35 calculates differences between a human region in one of the two inter-person images and a region in the other inter-person image corresponding to that human region, and supplies the calculated differences to the threshold value determining unit 37. In other words, the human mask portion difference calculator 35 calculates differences between the human region in the first inter-person image and the corresponding region in the second inter-person image, as well as differences between the human region in the second inter-person image and the corresponding region in the first inter-person image. Thus, differences between human regions and background regions are obtained.

The background portion difference calculator 36 calculates differences between the overlapping regions in the two human region-subtracted images supplied from the human mask portion subtraction processor 34, and supplies the calculation results to the subtraction processor 38. Herein, the overlapping regions in the human region-subtracted images refer to the regions that overlap each other when the human region-subtracted images are aligned such that the same subjects are superimposed over the two human region-subtracted images. These overlapping regions represent the regions capturing the background.

The threshold value determining unit 37 determines a threshold value by conducting a threshold value determining process on the basis of the difference calculation results supplied from the human mask portion difference calculator 35, and supplies the determined threshold value to the subtraction processor 38. When computing the difference at corresponding pixel positions in the two photographed images, the threshold value determined by the threshold value determining unit 37 is used to determine from that difference whether the two corresponding pixel positions are both part of a background region, or are respectively part of a human region and a background region.

The subtraction processor 38 uses the differences from the background portion difference calculator 36 and the threshold value from the threshold value determining unit 37 to subtract the human regions from the human region-subtracted images supplied from the human mask portion subtraction processor 34. The subtraction processor 38 takes the result to be the seam candidate region, which is supplied to the micro-region adder 39.

The micro-region adder 39 corrects the seam candidate region supplied from the subtraction processor 38 as appropriate, and supplies the result to the center-penetrating region adder 40 and the seam determining unit 22.

The center-penetrating region adder 40 determines a center-penetrating region on the basis of the face detection results from the face detectors 31 and the seam candidate region from the micro-region adder 39, and supplies the determined center-penetrating region to the seam determining unit 22.

Herein, the center-penetrating region refers to a region in between the figures of the two persons given as the primary subjects, and refers to a region that is not the seam candidate region. The center-penetrating region is a region which is undesirable as the region of the seam.

The seam determining unit 22 determines a seam between the photographed images IP by conducting a seam determining process on the basis of the supplied photographed images IP as well as the seam candidate region and center-penetrating region from the seam candidate region determining unit 21, and supplies the determined seam to the combining unit 23. Herein, the seam determining process corresponds to the second step discussed earlier.

The seam determining unit 22 is also equipped with a difference calculator 51 and a dividing line detector 52.

The difference calculator 51 generates a difference map indicating differences between the photographed images IP on the basis of the supplied photographed images IP, the seam candidate region from the micro-region adder 39, and the center-penetrating region from the center-penetrating region adder 40, and supplies the generated difference map to the dividing line detector 52. However, the pixel values of individual pixels in the difference map may be appropriately modified on the basis of respective regions such as the center-penetrating region.

The dividing line detector 52 determines a seam between the photographed images IP on the basis of the difference map supplied from the difference calculator 51, and supplies the determined seam to the combining unit 23.

The combining unit 23 conducts a combining process that combines the supplied two photographed images IP at the position of the seam supplied from the dividing line detector 52, and generates an output image OP. The combining unit 23 then outputs the output image OP obtained by the combining process. Note that the combining process corresponds to the final step (third step) discussed earlier.

[Face Detecting Process]

Next, processes conducted by the respective units included in the image processing apparatus 11 in FIG. 1 will be described.

First, the face detecting process performed by the face detectors 31 will be described.

Figure 2:
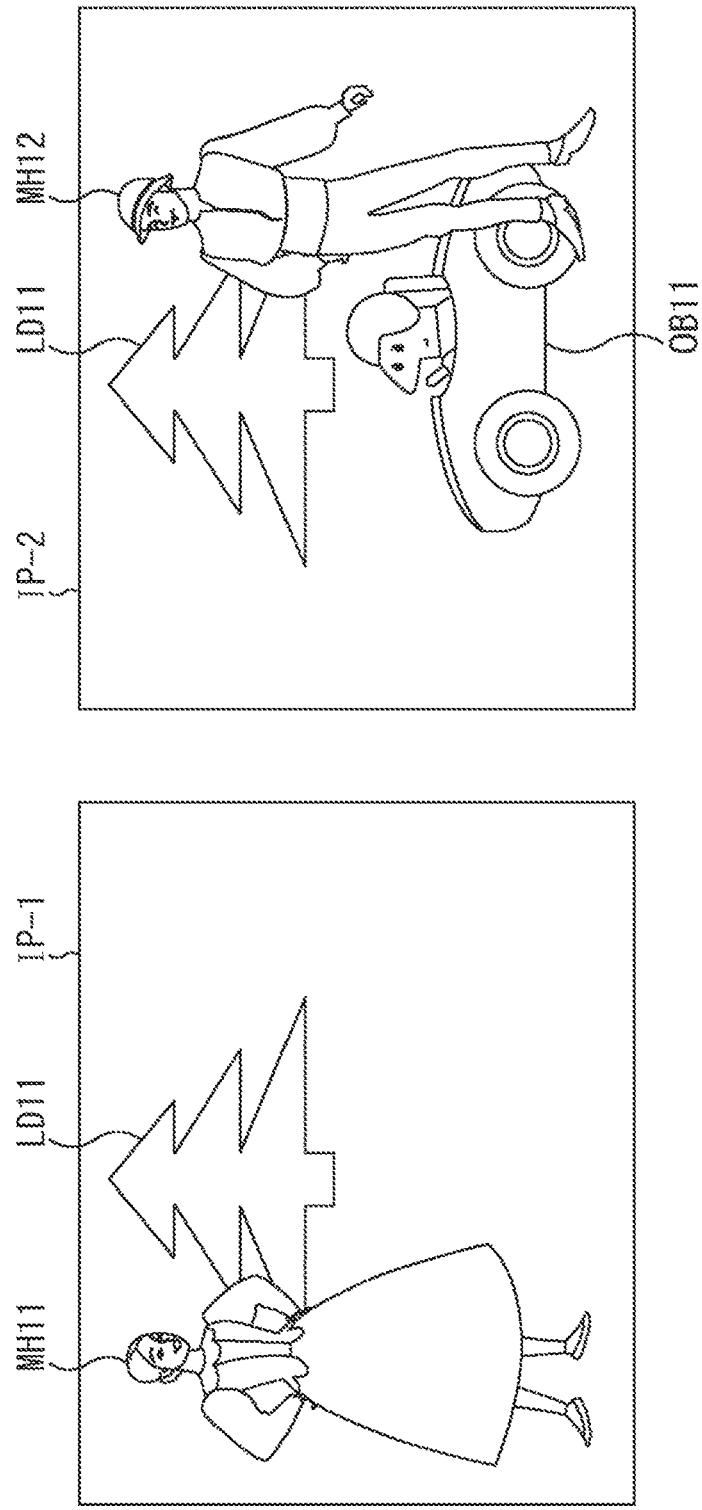
FIG. 2 is a diagram illustrating an example of photographed images.

As an example, assume that a first photographed image IP-1 and a second photographed image IP-2 are supplied to the image processing apparatus 11 as illustrated in FIG. 2. Note that in FIG. 2, portions corresponding to the case in FIG. 1 are denoted with the same reference signs, and description thereof may be reduced or omitted as appropriate.

The photographed image IP-1 and the photographed image IP-2 illustrated in FIG. 2 are the same images as the photographed images IP illustrated in FIG. 1.

The first photographed image IP-1 includes a woman MH11 as its primary subject, and a tree LD11 as a landscape. Also, the second photographed image IP-2 includes a man MH12 as its primary subject, and a tree LD11 as well as an automobile OB11 as a landscape.

In the face detectors 31, a face detecting process is applied to the supplied photographed images IP. Note that since a process to detect a face from a given image is a typical and established process, details thereof are omitted herein.

Figure 3:
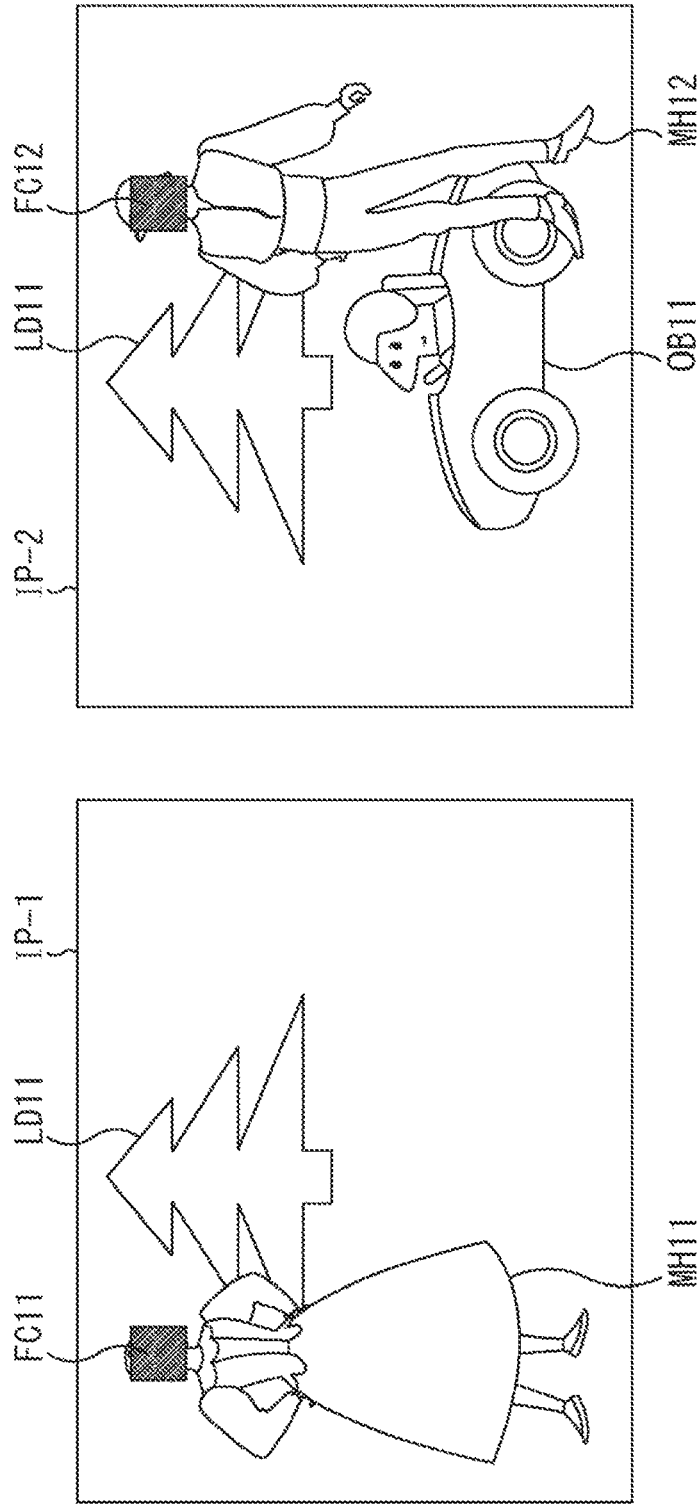
FIG. 3 is a diagram illustrating face detection.

When the photographed images IP are processed by the face detecting process, a facial region is detected from each of the photographed images IP as illustrated in FIG. 3, for example.

In this example, the region of the face of the woman MH11 is detected from the first photographed image IP-1 as the facial region FC11, while the region of the face of the man MH12 is detected from the second photographed image IP-2 as the facial region FC12. Additionally, the facial region FC11 and the facial region FC12 are rectangular regions.

Position information for the facial region FC11 and the facial region FC12 obtained in this way may be output from the face detectors 31, for example.

[Inter-person Acquiring Process]

After performing the face detecting process, next the inter-person acquirer 32 performs the inter-person acquiring process.

For example, consider lines that divide the facial region FC11 and the facial region FC12 obtained by the face detecting process through their respective centers, as illustrated in FIG. 4. Note that in FIG. 4, portions corresponding to the case in FIG. 3 are denoted with the same reference signs, and description thereof may be reduced or omitted as appropriate.

In FIG. 4, the dividing line L11 is the straight line in the vertical (perpendicular) direction of the drawing that divides the facial region FC11 detected from the first photographed image IP-1 through its center, while the dividing line L12 is the straight line in the vertical direction of the drawing that divides the facial region FC12 detected from the second photographed image IP-2 through its center.

When the dividing line L11 is determined, the region of the first photographed image IP-1 on the side of the dividing line L11 opposite to the dividing line L12 of the second photographed image IP-2 is deleted. Similarly, the region of the second photographed image IP-2 on the side of the dividing line L12 opposite to the dividing line L11 of the first photographed image IP-1 is deleted.

Thus, the inter-person image HP-1 and the inter-person image HP-2 illustrated in FIG. 5 are obtained.

In FIG. 5, the inter-person image HP-1 is an image of the region to the right of the dividing line L11 in the photographed image IP-1 in FIG. 4. The shaded region in FIG. 5 is the region that was deleted from the photographed image IP-1, or in other words, the region of the photographed image IP-1 not taken to be part of the inter-person image HP-1.

Also, the inter-person image HP-2 is an image of the region to the left of the dividing line L12 in the photographed image IP-2 in FIG. 4. The shaded region is the region that was deleted from the photographed image IP-2, or in other words, the region of the photographed image IP-2 not taken to be part of the inter-person image HP-2.

The inter-person image HP-1 and the inter-person image HP-2 obtained by the inter-person acquiring process are output from the inter-person acquirer 32.

The purpose for performing the processing in the inter-person acquiring process and subsequent processes will now be explained. In other words, the final goal of the seam candidate region determining process will now be described.

The final goal of the seam candidate region determining process is to subtract the human portions (regions) from the photographed images IP without subtracting the pixel positions of background portions, leaving the remainder as a candidate for the seam region. In other words, the final goal is to remove the regions of the woman MH11 and the man MH12 from the photographed images IP while leaving the region SC11 between the dividing lines of the facial regions for the woman MH11 and the man MH12, as illustrated in FIG. 6, for example.

Figure 6:
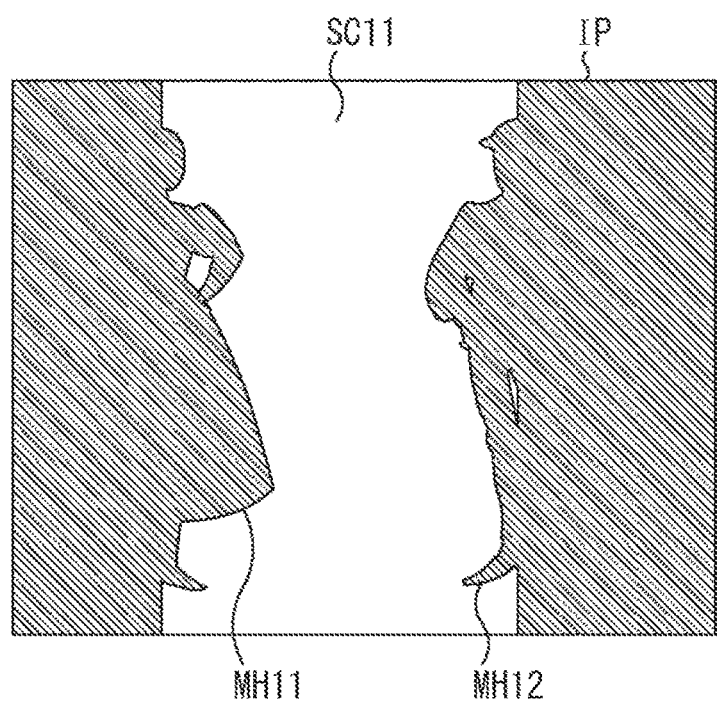
FIG. 6 is a diagram illustrating a seam candidate region.

In the example in FIG. 6, shading is applied to the woman MH11 in the photographed images IP and the region to the left of her dividing line L11 in the drawing, as well as to the man MH12 in the photographed images IP and the region to the right of his dividing line L12 in the drawing. In addition, the region obtained by deleting the shaded regions from the photographed images IP is taken to be the region SC11. The goal is to subtract the other regions, leaving only the region SC11 of the photographed images IP.

Obviously, it is very difficult to distinguish between the automobile OB11 and the man MH12 given as the primary subject illustrated in FIG. 5, for example. Furthermore, there are also false determinations due to noise, and thus it is almost too difficult to accurately extract the region SC11 in FIG. 6. Consequently, the final goal of the seam candidate region determining process is to extract a region as equivalent to the region SC11 as possible.

[Human Mask Generating Process]

After performing the inter-person acquiring process, next the human mask generator 33 performs the human mask generating process.

In the human mask generating process, human masks are generated in the form of information on the regions of human in the photographed images IP from the facial region FC11 and the facial region FC12 illustrated in FIG. 4, for example.

For generating a human mask, it is conceivable to have a rectangular region with a width that is BODY_W times the width of the facial region, and a height that BODY_H times the height of the facial region.

Figure 7:
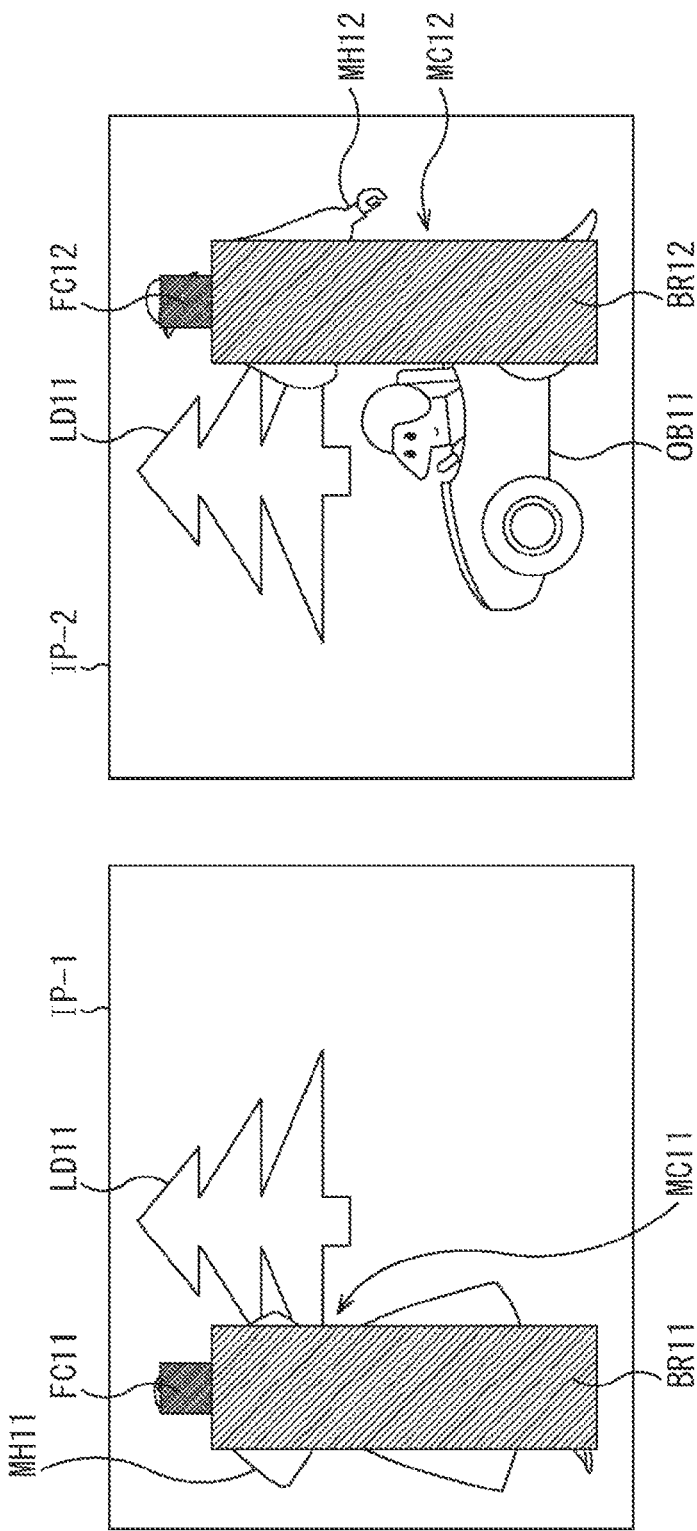
FIG. 7 is a diagram illustrating human masks.

In other words, as illustrated in FIG. 7, for example, take the region BR11 to be a rectangular region positioned directly below the facial region FC11 of the photographed image IP-1, with a width (the length in the horizontal direction of the drawing) that is BODY_W times the width of the facial region FC11 and a height (the length in the vertical direction of the drawing) that is BODY_H times the height of the facial region FC11. The region BR11, which is positioned directly below the facial region FC11 with a magnitude determined by the magnitude of the facial region FC11 in this way, is the region of the body of the person given as the primary subject.

Thus, in the human mask generating process, a region made up of the facial region FC11 and the region BR 11 is taken to be a human mask MC11. The region of this human mask MC11 is the region of the person who is the primary subject.

Similarly, for the photographed image IP-2, the rectangular region positioned directly below the facial region FC12 with a width that is BODY_W times the width of the facial region FC12 and a height that is BODY_H times the height of the facial region FC12 is taken to be the region BR12. A region made up of the facial region FC12 and the region BR12 is then taken to be a human mask MC12.

The human mask generator 33 outputs position information for the human mask MC11 and the human mask MC12 obtained by the human mask generating process.

Note that BODY_W and BODY_H are parameters for obtaining the region of a human body, typically set to the respective values of 3 and 7, for example. By setting such numerical values, it is possible to specify a suitable magnitude as the region of a human.

[Human Mask Portion Subtracting Process]

After performing the human mask generating process, subsequently the human mask portion subtraction processor 34 performs the human mask portion subtracting process.

In the human mask portion subtracting process, the regions indicated by the human masks are additionally deleted from the inter-person images on the basis of the human masks output from the human mask generator 33 to yield human region-subtracted images.

Figure 8:
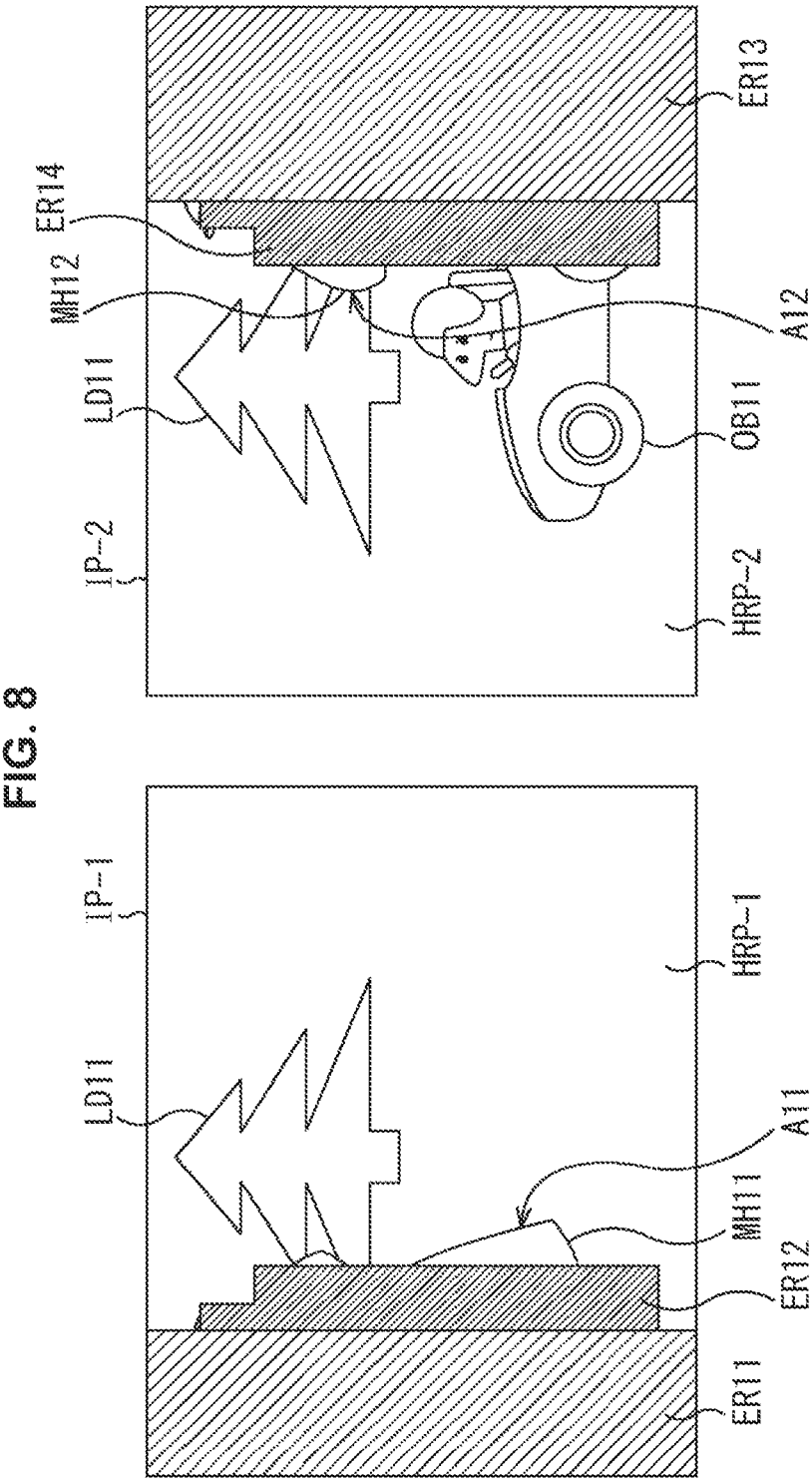
FIG. 8 is a diagram illustrating human region-subtracted images.

For example, as illustrated in FIG. 8, the image of the remaining region after removing the shaded region ER 11 from the first photographed image IP-1 is the inter-person image HP-1 illustrated in FIG. 5.

In the human mask portion subtracting process, the region ER12 indicated by a human mask is additionally removed from its including region that was obtained by removing the region ER11 from the photographed image IP-1, and the result is taken to be the human region-subtracted image HRP-1.

Note that in FIG. 8, portions corresponding to the case in FIG. 1 are denoted with the same reference signs, and description thereof may be reduced or omitted as appropriate.

In FIG. 8, the region ER12 represents the part of the region of the human mask MC11 in FIG. 7 from the photographed image IP-1 that is included in the region obtained by removing the region ER11 from the photographed image IP-1. Consequently, the human region-subtracted image HRP-1 is an image of the region obtained by additionally removing (deleting) the region of the human mask MC11 from the inter-person image HP-1.

Although the human region-subtracted image HRP-1 obtained in this way is an image in which the human region has been removed from the inter-person image HP-1, the human region-subtracted image HRP-1 may still include portions such as part of the skirt of the woman MH11 given as the primary subject, as indicated by the arrow A11.

Note that in FIG. 8, the region ER11 represents the region removed from the photographed image IP-1 by the inter-person acquiring process, while the region ER12 represents the region removed from the photographed image IP-1 by the human mask portion subtracting process. Although these regions are both removed from the photographed image IP-1, the regions are illustrated separately in the drawings to aid comprehension. In other words, in actual processing, the region ER11 and the region ER12 may be taken to be the removed region, without individually distinguishing the regions.

In addition, the human mask portion subtracting process is also performed on the photographed image IP-2, similarly to the case of the photographed image IP-1.

In other words, the region ER14 indicated by a human mask is additionally removed from its including region that was obtained by removing the region ER13 from the photographed image IP-2, and the result is taken to be the human region-subtracted image HRP-2.

Herein, the image of the remaining region after removing the region ER13 from the second photographed image IP-2 is the inter-person image HP-2 illustrated in FIG. 5. Additionally, the region ER14 represents the part of the region of the human mask MC12 in FIG. 7 from the photographed image IP-2 that is included in the region obtained by removing the region ER13 from the photographed image IP-2. Consequently, the human region-subtracted image HRP-2 is an image of the region obtained by additionally removing (deleting) the region of the human mask MC12 from the inter-person image HP-2.

Although the human region-subtracted image HRP-2 obtained in this way is an image in which the human region has been removed from the inter-person image HP-2, the human region-subtracted image HRP-2 may still include portions such as part of the sleeve of the man MH12 given as the primary subject, as indicated by the arrow A12.

Note that likewise for the photographed image IP-2, the region ER13 and the region ER14 are illustrated separately in the drawings to aid comprehension.

After performing the human mask portion subtracting process, the human mask portion subtraction processor 34 outputs the human region-subtracted image HRP-1 and the human region-subtracted image HRP-2 obtained as a result to the background portion difference calculator 36 and the subtraction processor 38.

[Human Mask Portion Difference Calculating Process]

After performing the human mask portion subtracting process, the human mask portion difference calculator 35 performs the human mask portion difference calculating process.

In the human mask portion difference calculating process, differences between the two photographed images IP are computed at positions capturing the persons given as the primary subjects of the photographed images IP.

Note that although various techniques for obtaining a difference exist, an embodiment of the present technology is not limited to a particular difference calculating technique.

For example, techniques of the related art, such as a technique that takes the absolute difference between luma signal values, a method that takes the distance between pixel data corresponding to the RGB space as the difference, and a method that examines texture similarities in a small block centered on the position of the current pixel, are established methods for computing differences between two images. In the present technology, any of these techniques may be used to compute differences between the two photographed images IP. Hereinafter, the description will proceed using simply the term "difference", irrespective of which technique is used.

In the human mask portion difference calculating process, differences between the two photographed images IP at positions capturing persons are specifically computed as follows.

Figure 9:
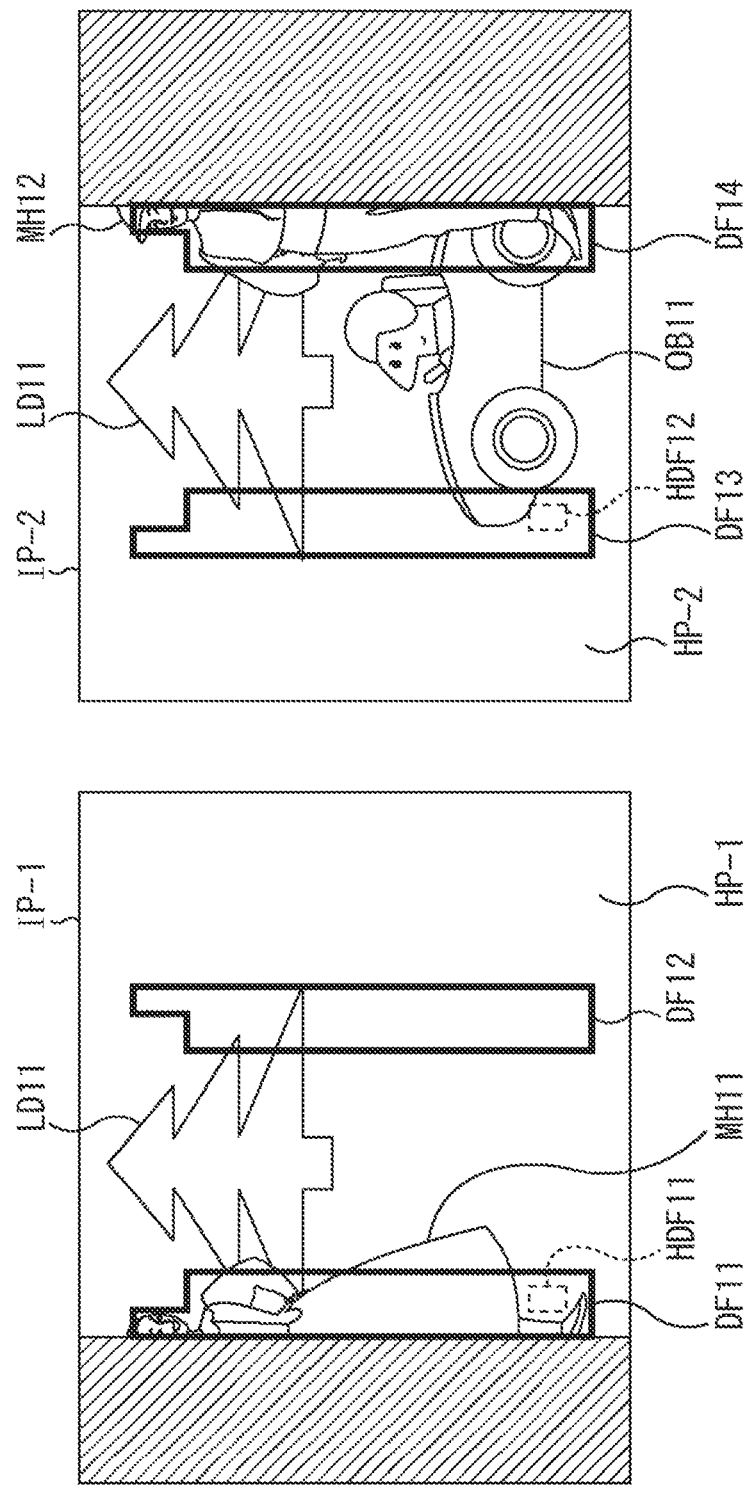
FIG. 9 is a diagram illustrating differences between a human region and a background region.

For example, as illustrated in FIG. 9, the first inter-person image HP-1 is an image obtained by removing the region to the left of the dividing line L11 illustrated in FIG. 4 from the photographed image IP-1. In FIG. 9, the shaded region of the photographed image IP-1 represents the removed region.

Similarly, the second inter-person image HP-2 is the image obtained by removing the region to the right of the dividing line L12 illustrated in FIG. 4 from the photographed image IP-2. In FIG. 9, the shaded region of the photographed image IP-2 represents the removed region.

Note that in FIG. 9, portions corresponding to the case in FIG. 5 are denoted with the same reference signs, and description thereof may be reduced or omitted as appropriate.

In such an inter-person image HP-1, the region DF11 is the part of the human mask MC11 illustrated in FIG. 7 that is included in the inter-person image HP-1. In other words, the region DF11 is the part of the human mask MC11 to the right of the dividing line L11 as illustrated in FIG. 9.

Also, in the inter-person image HP-1, the region DF12 is a region existing at the same position as the part of the human mask MC12 illustrated in FIG. 7 that is included in the inter-person image HP-2.

Furthermore, in the inter-person image HP-2, the region DF13 is a region existing at the same position as the part of the human mask MC11 illustrated in FIG. 7 that is included in the inter-person image HP-1, while the region DF14 is the part of the human mask MC12 that is included in the inter-person image HP-2.

Herein, the region DF13 is the region that overlaps with the region DF11 in the case of superimposing the inter-person image HP-1 and the inter-person image HP-2 such that the same subjects overlap. Similarly, the region DF12 is the region that overlaps with the region DF14 in the case of superimposing the inter-person image HP-1 and the inter-person image HP-2 such that the same subjects overlap.

Also, since the region DF11 in the first inter-person image HP-1 is the region of the woman MH11, the region DF11 is a human region. In contrast, although the region DF12 in the inter-person image HP-1 corresponds to the region of the man MH12 in the second inter-person image HP-2, the region DF12 is a background region since the man MH12 is not captured in the first inter-person image HP-1.

Similarly, the region DF13 in the second inter-person image HP-2 is a background region, while the region DF14 is a human region.

Upon obtaining the regions DF11 to DF14 in this way, the differences between the pixel values of the pixels at the same positions in the region DF11 and the region DF13, and the differences between the pixel values of the pixels at the same positions in the region DF12 and the region DF14, are calculated. The amount of difference data obtained by the difference calculation is equivalent to the sum of the total number of pixels in the region DF11 and the total number of pixels in the region DF14.

With such difference calculation, differences between the region DF11 capturing a person and the background region DF13, as well as differences between the region DF14 capturing a person and the background region DF12, are computed.

However, the region DF11 also includes regions which are not human regions, such as the region HDF11. The region HDF12 in the region DF13 at the same position as the region HDF11 is the same background region as the region HDF11. For this reason, the differences between the region HDF11 and the region HDF12 become the differences between background regions. However, since there are almost no differences between such regions, the difference at each position in the region DF11 and the region DF13 is basically the difference between the human region and the background region. The above is also similar for the differences between the region DF12 and the region DF14.

Consequently, the differences between the pixel values of corresponding pixels in the respective regions DF11 and DF13, as well as the differences between the pixel values of corresponding pixels in the respective regions DF12 and DF14, are supplied from the human mask portion difference calculator 35 to the threshold value determining unit 37. The amount of such difference data is the same number as the total number of pixels in the region DF11 and the region DF14.

[Background Portion Difference Calculating Process]

After performing the human mask portion difference calculating process, the background portion difference calculator 36 performs the background portion difference calculating process. In other words, difference calculation that is the same as in the human mask portion difference calculating process is also performed on the remaining regions that were not subtracted (removed) from the inter-person images by the human mask portion subtracting process, or in other words, the human region-subtracted images.

Figure 10:
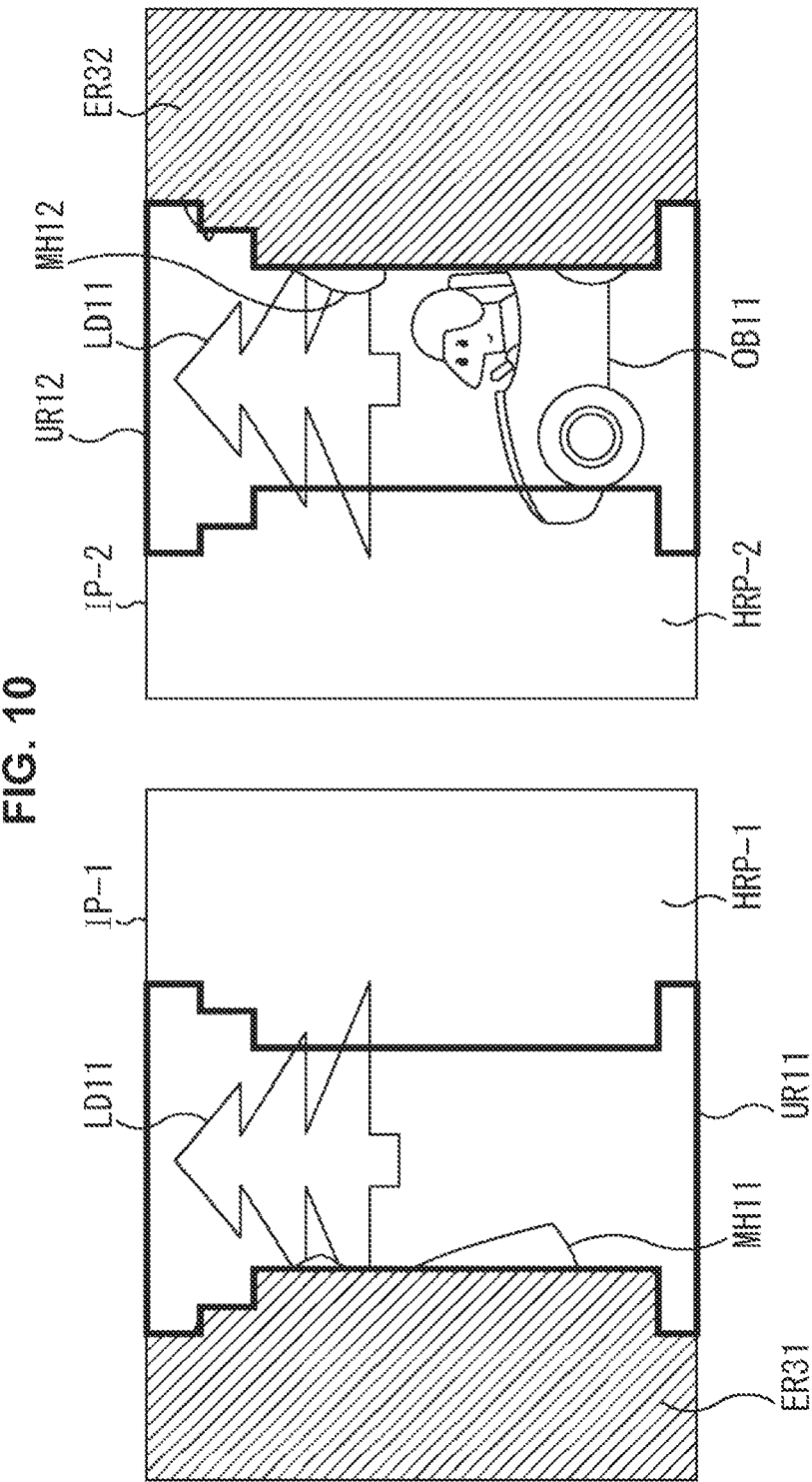
FIG. 10 is a diagram illustrating differences between background regions themselves.

For example, the background portion difference calculating process may compute differences between the region UR11 in the human region-subtracted image HRP-1 and the region UR12 in the human region-subtracted image HRP-2, as illustrated in FIG. 10. Note that in FIG. 10, portions corresponding to the case in FIG. 8 are denoted with the same reference signs, and description thereof may be reduced or omitted as appropriate.

In FIG. 10, the image of the region obtained by removing the shaded region ER31 from the photographed image IP-1 is the human region-subtracted image HRP-1. Similarly, the image of the region obtained by removing the shaded region ER32 from the photographed image IP-2 is the human region-subtracted image HRP-2.

In addition, the region UR11 subjected to difference calculation in the human region-subtracted image HRP-1 is the region in the human region-subtracted image HRP-1 that overlaps with the human region-subtracted image HRP-2 when the human region-subtracted image HRP-1 and the human region-subtracted image HRP-2 are superimposed such that the same subjects overlap.

Stated differently, the region UR11 is the region remaining after removing the region corresponding to the region ER32 of the second photographed image IP-2 from the human region-subtracted image HRP-1, and is a region that approximately background only when the two photographed images IP are superimposed.

The region UR12 subjected to difference calculation in the human region-subtracted image HRP-2 is the region in the human region-subtracted image HRP-2 that overlaps with the human region-subtracted image HRP-1 when the human region-subtracted image HRP-1 and the human region-subtracted image HRP-2 are superimposed such that the same subjects overlap.

Upon obtaining the region UR11 and the region UR12 in this way, the differences between the pixel values of the pixels at the same positions in these regions UR11 and UR12 are calculated. In other words, differences between the overlapping regions in the human region-subtracted images are computed. The amount of difference data obtained by the difference calculation is equivalent to the total number of pixels in the region UR11.

Consequently, the differences between the pixel values of respective pixels in the background regions UR11 and UR12 are supplied from the background portion difference calculator 36 to the subtraction processor 38.

[Threshold Value Determining Process]

After performing the human mask portion difference calculating process and the background portion difference calculating process to obtain differences between the human regions and background regions as well as differences between the background regions themselves, the threshold value determining unit 37 performs the threshold value determining process to determine a threshold value.

The rationale for a threshold value characteristic of an embodiment of the present technology will now be explained.

Since the portions captured as the background (still objects) in both the first photographed image IP-1 and the second photographed image IP-2 are the same background, the value of the difference between corresponding positions is nominally 0 if the difference between the photographed images IP is taken at respective positions. In practice, however, the value of the difference becomes a small non-zero value due to effects such as noise.

Meanwhile, if taking the difference for part of a person captured in only one of either the first photographed image IP-1 or the second photographed image IP-2, the difference value becomes a large non-zero value.

The final goal of the seam candidate region determining process is to compute a seam candidate region by subtracting the human portions while at the same time not subtracting, as far as possible, the pixel positions where the difference value becomes non-zero due to the effects of noise even though the pixel position is a background portion, and leave the remainder as the seam candidate region.

At this point, there is a problem. Namely, there is the problem of determining which value to set as a threshold value for distinguishing differences between the background regions and the human regions which are to be removed from the seam candidate region, versus differences between the background regions themselves.

In the case of setting the threshold value to a very small value, any slight difference in corresponding pixel values between images may become equal to or greater than the threshold value, and the corresponding regions in the two photographed images IP whose differences are calculated will be removed from the seam candidate region.

In this case, it is possible to reliably subtract the regions of human portions from the seam candidate region, but positions where a difference exists due to noise, despite being part of a background region, may also be subtracted from the seam candidate region.

On the other hand, in the case of setting the threshold value to a very large value, even large differences in corresponding pixel values between images may become less than or equal to the threshold value, and the regions whose differences are calculated will not be removed from the seam candidate region. In this case, it is presumed that regions of the background portion will remain without being subtracted from the seam candidate region even if the difference is non-zero due to some amount of noise. However, there is a high probability that regions of human portions will also remain as part of the seam candidate region.

Note that the regions of human portions referred to herein include the part of the skirt of the woman MH11 indicated by the arrow A11 in FIG. 8 and the part of the sleeve of the man MH12 indicated by the arrow A12 which exist in the human region-subtracted images obtained by the human mask portion subtracting process, for example. In other words, the regions of human portions refer to the remaining regions of human projections that were not removed from the human region-subtracted images.

To summarize the above explanation, the problem with a threshold value is the problem of how to set the threshold value in order to subtract the part of the skirt indicated by the arrow A11 and the part of the sleeve indicated by the arrow A12 from the seam candidate region as human regions.

Thus, in this exemplary embodiment, it is configured such that an optimal threshold value for the input photographed images is determined automatically in a threshold value determining process performed by the threshold value determining unit 37. In other words, the following processing is performed in the threshold value determining process.

First, a cumulative histogram is generated for the difference data computed by the human mask portion difference calculating process.

Figure 11:
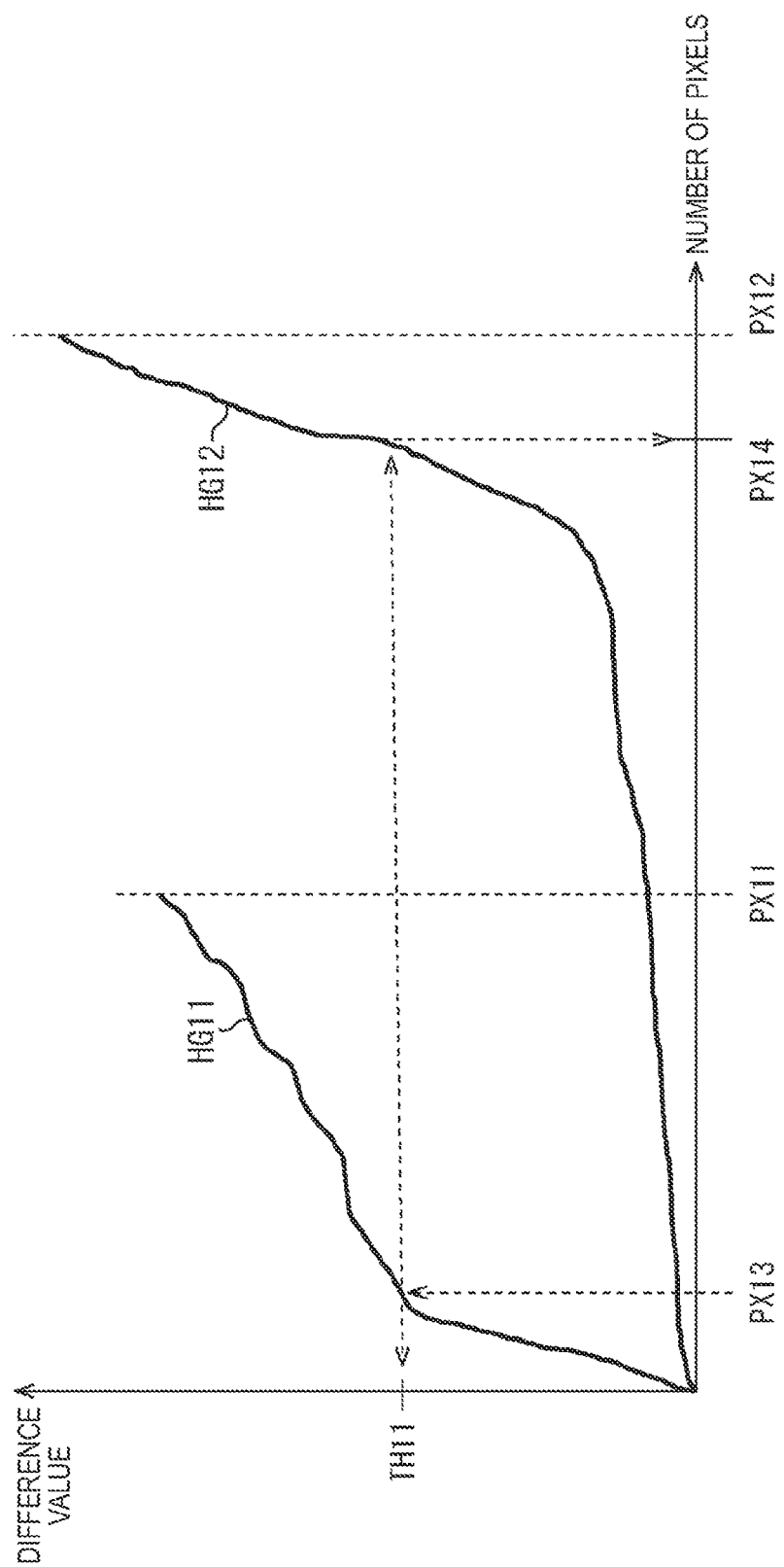
FIG. 11 is a diagram illustrating a cumulative histogram using threshold value determination.

For example, the cumulative histogram indicated by the curve HG11 in FIG. 11 may be generated on the basis of the calculated results for the differences between pixels at the same positions in the region DF11 and the region DF13 as well as the differences between pixels at the same positions in the region DF12 and the region DF14 in FIG. 9. In FIG. 11, the horizontal and vertical axes represent the number of pixels and the difference value, respectively.

The cumulative histogram indicated by the curve HG11 (hereinafter also designated the cumulative histogram HG11) is a cumulative histogram of differences between human regions and background regions, and the number of pixels at the position PX11 is the total number of pixels in the region DF11 and the region DF14.

Additionally, the cumulative histogram indicated by the curve HG12 (hereinafter also designated the cumulative histogram HG12) is a cumulative histogram of differences between pixels at the same positions in the region UR11 and the region UR12 illustrated in FIG. 10. The cumulative histogram HG12 is a cumulative histogram of differences between background regions themselves, and the number of pixels at the position PX12 is the total number of pixels in the region UR11.

The cumulative histogram HG11, although having a degree of error, mostly indicates what kinds of values are obtained by taking the differences between human and background.

Herein, "a degree of error" is mentioned because the region DF11 in FIG. 9 includes not only human regions but also background regions such as the region HDF11, for example.

In FIG. 9, the region in the second inter-person image HP-2 that corresponds to the region HDF11 is the region HDF12 in the region DF13. These corresponding regions HDF11 and HDF12 are both regions of background portions in the two photographed images. Consequently, the differences computed for the region HDF11 and the region HDF12 are not differences between a human region and a background region. However, since the region DF11 is mostly filled with a human projection and small regions such as the region HDF11 can be ignored, the term "a degree of error" is used.

At this point, if the above degree of error is assumed to be 20%, for example, the difference value TH11 corresponding to the position PX13 of the lower 20% of the cumulative histogram HG11 becomes one guide. The number of pixels indicated by the position PX13 is 20% of the number of pixels indicated by the position PX11, and the difference value at the position PX13 of the cumulative histogram HG11 is the difference value TH11.

Consequently, if the difference value computed for a given pixel position in the two photographed images IP is equal to or greater than the difference value TH11, it is conceivable that the pixel position captures a human in one of the photographed images IP, and captures the background in the other of the photographed images IP. Note that in the an embodiment of the present technology, the number of pixels used to determine the threshold value is not limited to be 20% of the total number of pixels, and may be any value, such as 10% or 30%.

In the threshold value determining process, the cumulative histogram HG11 is generated from the calculated results for the differences between human regions and background regions, and the difference value TH11 at the position PX13 for the number of pixels of the lower 20% of the cumulative histogram HG11 is computed as the threshold value.

Consequently, in the cumulative histogram HG12, the pixels whose differences were calculated, and which where accumulated up to the position PX14 for the number of pixels where the difference value becomes the difference value TH11, are the pixels from which differences between background regions was obtained. Conversely, the pixel accumulated from the position PX14 to the position PX12 in the cumulative histogram HG12 are the pixels from which differences between a human region and a background region was obtained.

The difference value TH11 obtained by the threshold value determining process is output from the threshold value determining unit 37 to the subtraction processor 38 as the threshold value.

[Subtracting Process]

Once a threshold value is determined by the threshold value determining process, the subtraction processor 38 performs the subtracting process using the determined threshold value, and human regions are subtracted from the seam candidate region.

For example, a process may be performed to subtract the part of the skirt of the woman MH11 indicated by the arrow A11 and the part of the sleeve of the man MH12 indicated by the arrow A12 in FIG. 8 from the seam candidate region.

In other words, the pixels in the remaining regions UR11 and UR12 in FIG. 10 which were not deleted from the photographed images IP by the human mask portion subtracting process are sorted to determine which pixels to take as pixels included in the seam candidate region. The difference for each pixel that was calculated by the background portion difference calculator 36 is used to sort out the pixels included in the seam candidate region.

In the subtracting process, pixel positions in the cumulative histogram HG12 having a difference that is equal to or greater than the previously computed threshold value, or in other words the difference value TH11, are taken to be pixel positions capturing a human at the pixel of one of the photographed images and capturing the background at the pixel of the other of the photographed images, and are deleted.

In the example in FIG. 11, the pixel positions accumulated from the position PX14 to the position PX12 are the pixel positions to delete (subtract).

Consequently, the region taken as the seam candidate region is the region made up of the remaining pixels after subtracting pixels with difference values equal to or greater than the threshold value in the regions UR11 and UR12 in FIG. 10, for example. In other words, the seam candidate region is the region made up of pixels with difference values less than the threshold value from among the pixels in the regions UR11 and UR12.

Figure 12:
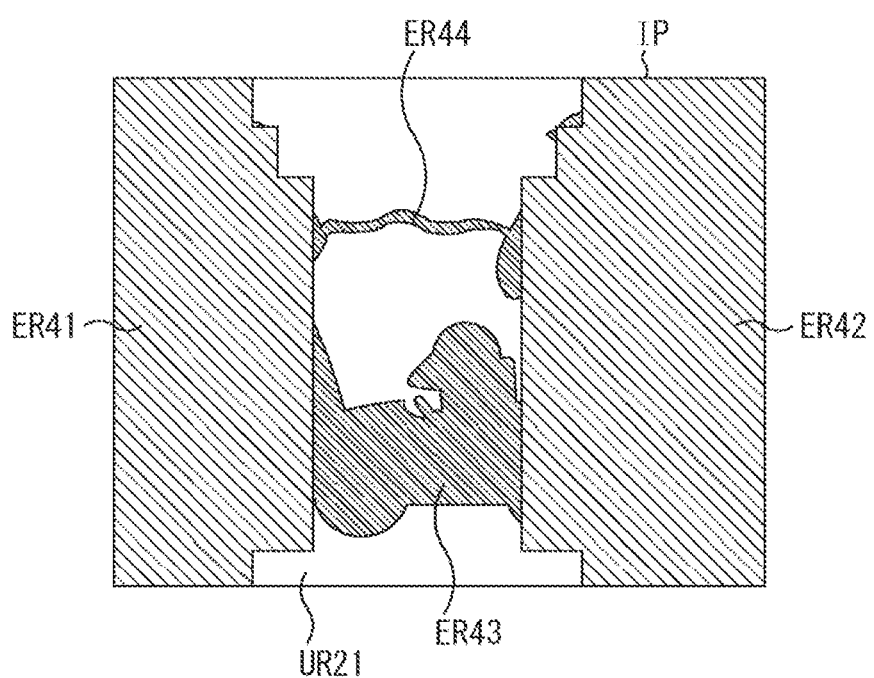
FIG. 12 is a diagram illustrating a seam candidate region.

Thus, the seam candidate region illustrated in FIG. 12 is obtained from the region UR11 and the region UR12 in FIG. 10, for example.

In FIG. 12, the region UR21 is the remaining region after removing the shaded regions ER41 and ER42 from the first or second photographed image IP. The region UR21 is the region UR11 or UR12 in the photographed images IP in FIG. 10.

Additionally, among the regions within the region UR21, the shaded regions are regions made up of pixels whose difference is equal to or greater than the threshold value, whereas the unshaded regions are regions made up of pixels whose difference is less than the threshold value.

Consequently, the unshaded regions within the region UR21 become the seam candidate region. Note that in FIG.

12, the region ER41 and the region ER42 represent the regions that were subtracted in the inter-person acquiring process and the human mask portion subtracting process.

Also, the shaded regions within the region UR21 represent the regions that were subtracted (deleted) by the subtracting process. Note that although the subtracted regions are illustrated separately in the drawings to aid comprehension, in actual processing both may be taken to be the deleted region without individually distinguishing the regions.

According to such a subtracting process, portions such as the part of the skirt of the woman MH11 indicated by the arrow A11 and the part of the sleeve of the man MH12 indicated by the arrow A12 in FIG. 8 are subtracted from the seam candidate region, for example.

However, since the automobile OB11 in the photographed images IP is only captured in the second photographed image IP-2 of the two photographed images IP, the automobile OB11 is also unintentionally subtracted from the seam candidate region. In FIG. 12, part of the region ER43 is the region of the unintentionally deleted automobile OB11, even though the automobile OB11 is not a primary subject.

Also, since a partial region of the region ER44 includes a large amount of noise, the differences between the two photographed images become large values in this region, which are determined to be equal to or greater than the threshold value in the threshold value process. As a result, this region is treated as a non-background region and is unintentionally subtracted from the seam candidate region.

Since these partial regions of the region ER43 and the region ER44 produce false determinations by the threshold value process, these regions are subtracted from the seam candidate region.

Once a seam candidate region is determined by the subtracting process, the seam candidate region is output from the subtraction processor 38 to the micro-region adder 39.

[Micro-region Adding Process]

In addition, once a seam candidate region is obtained, the micro-region adder 39 performs a micro-region adding process that reduces false determinations by the threshold value process performed on the seam candidate region.

Figure 13:
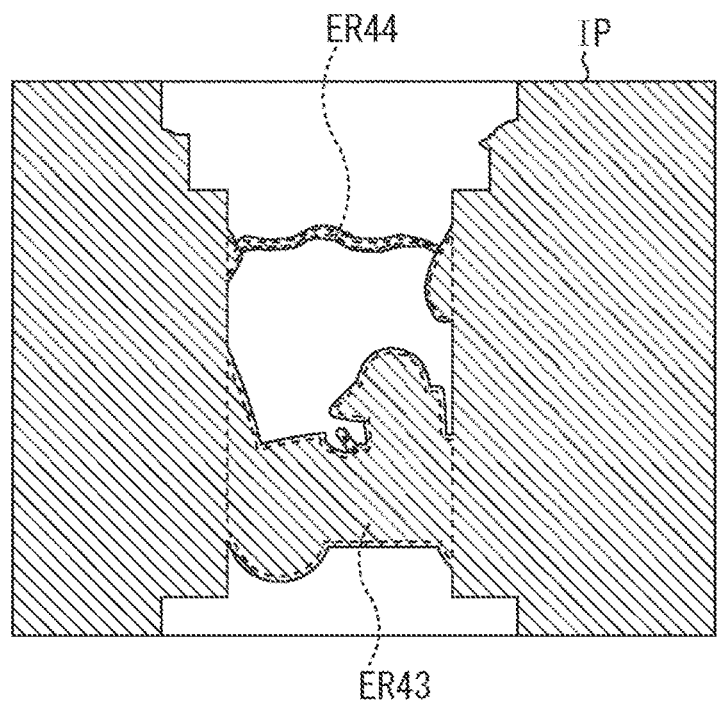
FIG. 13 is a diagram illustrating a micro-region adding process.

The input for the micro-region adding process is, for example, information for specifying the seam candidate region in the photographed images IP as indicated in FIG. 13, or in other words, information indicating the shaded region. Note that in FIG. 13, portions corresponding to the case in FIG. 12 are denoted with the same reference signs, and description thereof may be reduced or omitted as appropriate. FIG. 13 is a re-illustration that does not distinguish the shaded regions from FIG. 12.

Figure 14:
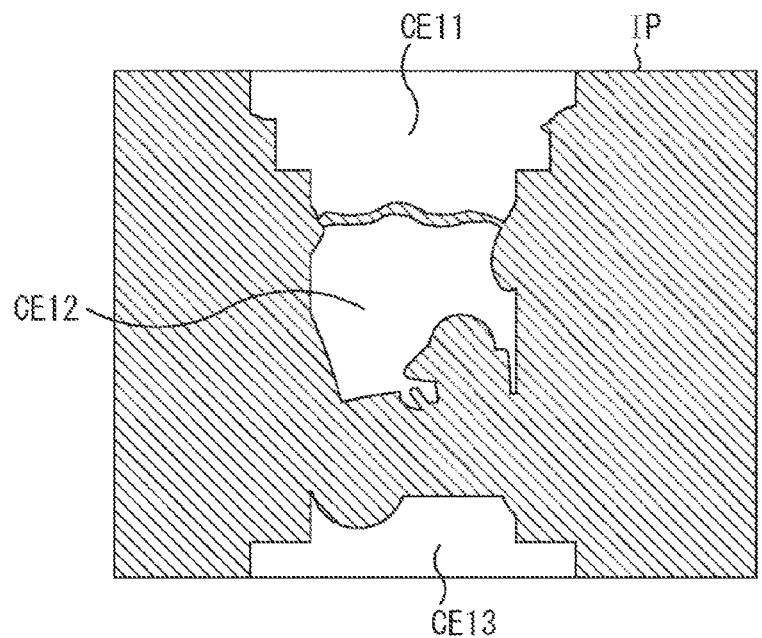
FIG. 14 is a diagram illustrating a micro-region adding process.

The micro-region adding process first segments the seam candidate region in the photographed images IP, or in other words, the remaining, unshaded region that was not subtracted. Thus, three segments CE11 to CE13 as illustrated in FIG. 14 are obtained, for example.

Next, a process that expands these segments CE11 to CE13, or in other words dilation, is performed. The dilation magnitude may be approximately four pixels, for example.

By performing dilation in this way, the dilated pixel positions will remain in the case of two adjoining segments. In other words, although some pixel positions may have been deleted, if segments may be joined by dilation, the deletion of the relevant pixel positions is canceled, and the pixel positions are kept as pixels in the seam candidate region.

Figure 15:
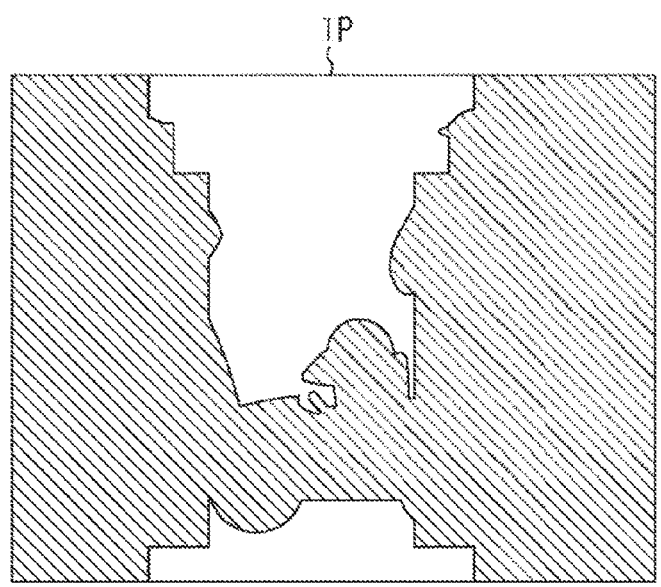
FIG. 15 is a diagram illustrating a micro-region adding process.

Thus, the seam candidate region illustrated in FIG. 15 is obtained as the dilated seam candidate region. In FIG. 15, the unshaded region of the photographed images IP is the seam candidate region.

Comparing the dilated seam candidate region illustrated in FIG. 15 to the non-dilated seam candidate region illustrated in FIG. 13, the seam candidate region in the example of FIG. 15 includes the partial region ER44. In other words, a region that produced a false determination by the threshold value process and initially was subtracted is restored and ultimately taken to be part of the seam candidate region.

Thus, it is possible to cancel the deletion (removal) of micro-regions falsely determined because of noise, and obtain a more suitable seam candidate region. The seam candidate region that is ultimately obtained is the region obtained by subtracting the approximate human regions and approximate background regions from the photographed images IP.

Once the micro-region adding process is performed and the seam candidate region is corrected, information specifying the seam candidate region, such as information on the shaded region in FIG. 15, for example, is supplied from the micro-region adder 39 to the center-penetrating region adder 40 and the difference calculator 51.

Note that hereinafter, information specifying the final seam candidate region obtained by the micro-region adding process will be designated mask information. As long as the mask information is information able to specify the seam candidate region, the mask information may be information indicating the unshaded region of FIG. 15, or in other words the seam candidate region, or alternatively, the mask information may be information indicating the shaded region of FIG. 15, or in other words the subtracted regions that were not taken to be part of the seam candidate region. Hereinafter, the description will proceed as though the mask information is information indicating the subtracted regions not taken to be part of the seam candidate region, or in other words, information indicating the regions which are masked for exclusion from the seam candidate region.

[Center-penetrating Region Adding Process]

As FIG. 15 demonstrates, it is not possible to draw a through-line from top to bottom in the drawing that passes through only the unshaded region of the photographed images IP, or in other words, the remaining seam candidate region that has not been subtracted.

Obviously, it would be sufficient to distinguish the region of the automobile OB11 illustrated in FIG. 2 from the human regions given as the primary subjects, such as the woman MH11 and the man MH12, and keep the portion of the automobile OB11 as part of the seam candidate region. However, the above approach is impractical due to the difficulty of distinguishing the region of the automobile OB11 from human regions such as the woman MH11 and the man MH12.

However, joining the two photographed images IP involves drawing a line that passes through (divides) the photographed images IP from top to bottom in the drawings. Thus, in an embodiment of the present technology, the seam is made to precisely pass through the center portion between the two users included in the photographed images IP, or in other words, between the woman MH11 and the man MH12. This is because passing through the center portion has a higher probability of not cutting through a human (the woman MH11 and the man MH12).

Figure 16:
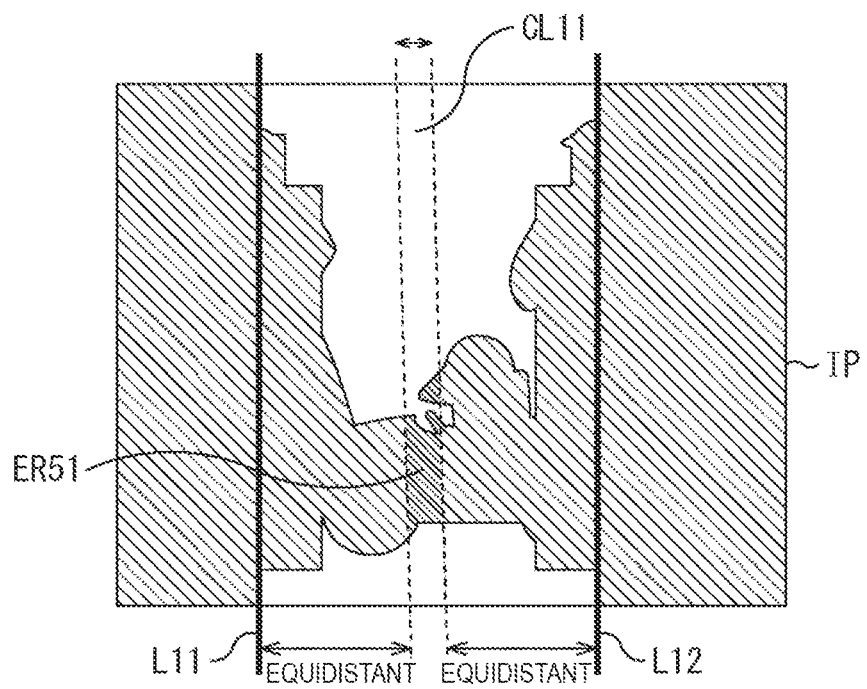
FIG. 16 is a diagram illustrating a center-penetrating region.

Now consider a region CL11 of the photographed images IP, which, as illustrated in FIG. 16, is 16 pixels wide, for example, and is equidistant from the dividing line L11 and the dividing line L12 computed in the inter-person acquiring process as described with reference to FIG. 4. Note that in FIG. 16, portions corresponding to the case in FIG. 4 are denoted with the same reference signs, and description thereof may be reduced or omitted as appropriate.

In FIG. 16, the unshaded region is the seam candidate region. Also, the region between the two broken lines which are between the dividing line L11 and the dividing line L12 in the photographed images IP is taken to be the region CL11. The region CL11 is 16 pixels wide in the horizontal direction of the drawing. Note that the horizontal width of the region CL11 is not limited to 16 pixels, and may be any number of pixels. For example, the horizontal width of the region CL11 may also be 8 pixels or 32 pixels.

Inside such a region CL11 that is 16 pixels wide, the shaded center-penetrating region ER51 is computed. The center-penetrating region ER51 is the region of the region CL11 that is not part of the seam candidate region, or in other words, a region indicated by the mask information. The center-penetrating region ER51 is a region that has been subtracted from the seam candidate region by the previous processes, and is a region that is undesirable as a seam if avoidable.

Once the center-penetrating region ER51 is computed by the center-penetrating region adding process, information indicating the center-penetrating region ER51 is output from the center-penetrating region adder 40 to the difference calculator 51.

The foregoing thus describes the seam candidate region determining process. The seam candidate region determining process accepts two photographed images IP as input, and outputs the mask information illustrated in FIG. 15, or in other words information indicating the regions subtracted from the photographed images IP and not taken to be part of the seam candidate region, as well as information indicating the center-penetrating region ER51 illustrated in FIG. 16.

Strictly speaking, the seam candidate region determining process also outputs information indicating whether to use the region on the right side or the region on the left side (in FIG. 2) of the first photographed image IP-1 during composition. This information is used in the combining process discussed later.

The question of whether to use the region on the left or right side of the photographed image IP-1 in the combining process may be determined according to which user's face is on the left side from among the two users detected by the face detecting process performed on the two photographed images IP.

In other words, in the case where the position of a face resulting from the face detecting process performed on the first photographed image IP-1 is to the left (in FIG. 2) of the position of a face resulting from the face detecting process performed on the second photographed image IP-2, or in other words, in the case of the example in FIG. 2, the region on the left side of the first photographed image IP-1 is used during composition.

Conversely, in the case where the position of a face resulting from the face detecting process performed on the first photographed image IP-1 is to the right (in FIG. 2) of the position of a face resulting from the face detecting process performed on the second photographed image IP-2, the region on the right side of the first photographed image IP-1 is used during composition.

Although FIG. 1 does not illustrate the flow of such information indicating which side of the first photographed image IP-1 to use during composition, specifically, such information is supplied to the combining unit 23.

[Seam Determining Process]

Next, the seam determining process that determines a seam will be described. The seam determining process includes two processes: a difference calculating process and an energy-minimizing dividing line detecting process.

First, in the difference calculating process, two photographed images IP are input and the difference is calculated for each of the corresponding pixel positions in those photographed images IP. The difference calculation technique may be the same difference calculation technique as in the human mask portion difference calculating process discussed earlier, or another calculation technique.

A small difference between pixel positions in the two photographed images IP means that a seam may not be noticeable if the two photographed images IP are joined at that pixel position. The rationale is the same as for that of the smoothing parameter in JP 2011-138313A and JP 2011-139288A discussed earlier.

In the difference calculating process, a difference map is generated using the mask information specifying the seam candidate region obtained by the seam candidate region determining process as well as the information indicating the center-penetrating region. Note that hereinafter, the region indicated by the mask information, or in other words the subtracted region not taken to be part of the seam candidate region of the photographed images IP, may also be designated the mask region.

Specifically, the difference values are forcibly set to infinite values at pixel positions which exist both in the mask region of the photographed images IP indicated by the mask information, as well as in regions which are not the center-penetrating region. For example, such regions may be the shaded regions of the photographed images IP illustrated in FIG. 16 which are not the center-penetrating region ER51.

In addition, a gain having a given magnitude equal to or greater than 1, such as 1000, for example, is applied to the difference value at pixel positions inside the center-penetrating region.

Thus, a difference map having properties like the following is obtained. Herein, the pixel values of pixels in the difference map basically represent the value of the difference in the pixel values between pixels at the same position in the two photographed images. However, the pixels values of pixels in the difference map at the same positions as specific pixels in the photographed images, such as the pixels inside the center-penetrating region discussed earlier, have infinite values or values with gain applied.

Property 1: Infinite values are set as the pixel values of pixels in the difference map corresponding to both the mask region indicated by the mask information obtained by the seam candidate region determining process as well as regions which are not inside the center-penetrating region.

Property 2: Very large values are set as the pixel values of pixels in the difference map corresponding to the center-penetrating region obtained by the seam candidate region determining process.

Property 3: The pixel values of pixels in the difference map corresponding to the seam candidate region take small values at pixels where the difference between the two photographed images at a particular pixel position is small, and take large values at pixels where the difference between the two photographed images is large.

In the difference calculating process, a difference map having the above three properties is computed and output from the difference calculator 51 to the dividing line detector 52.

In the energy-minimizing dividing line detecting process performed by the dividing line detector 52, a single line (dividing line) joining the top and bottom edges of the photographed images is computed, and the dividing line thus obtained is taken to be the seam between the photographed images IP.

The dividing line is computed by taking arbitrary pixel positions at the top and bottom edges of the difference map as start and end points, respectively, computing the path from among the paths from the start point to the end point that minimizes the total value of the pixel values of the pixels in the difference map along the path, and taking the line on the photographed image that passes through the same positions as that path to be the dividing line. Consequently, the seam between the photographed images IP is substantially computed as follows.

Namely, a line that passes through the top edge and the bottom edge of the seam candidate region and divides the seam candidate region (in other words, a dividing line) is computed as the seam. At this point, a dividing line may be computed with a parameter specifying that the dividing line pass through only the seam candidate region as much as possible, but allowing the dividing line to pass through the center-penetrating region in cases where the above such dividing line is not obtained. Note that the dividing line does not pass through regions which are part of the mask region but not inside the center-penetrating region.

In practice, it is possible to easily compute such a dividing line by dynamic programming. However, since dynamic programming is an established technology, detailed description thereof is omitted herein.

Once a dividing line is computed as discussed above, the dividing line is output from the dividing line detector 52 to the combining unit 23.

Figure 17:
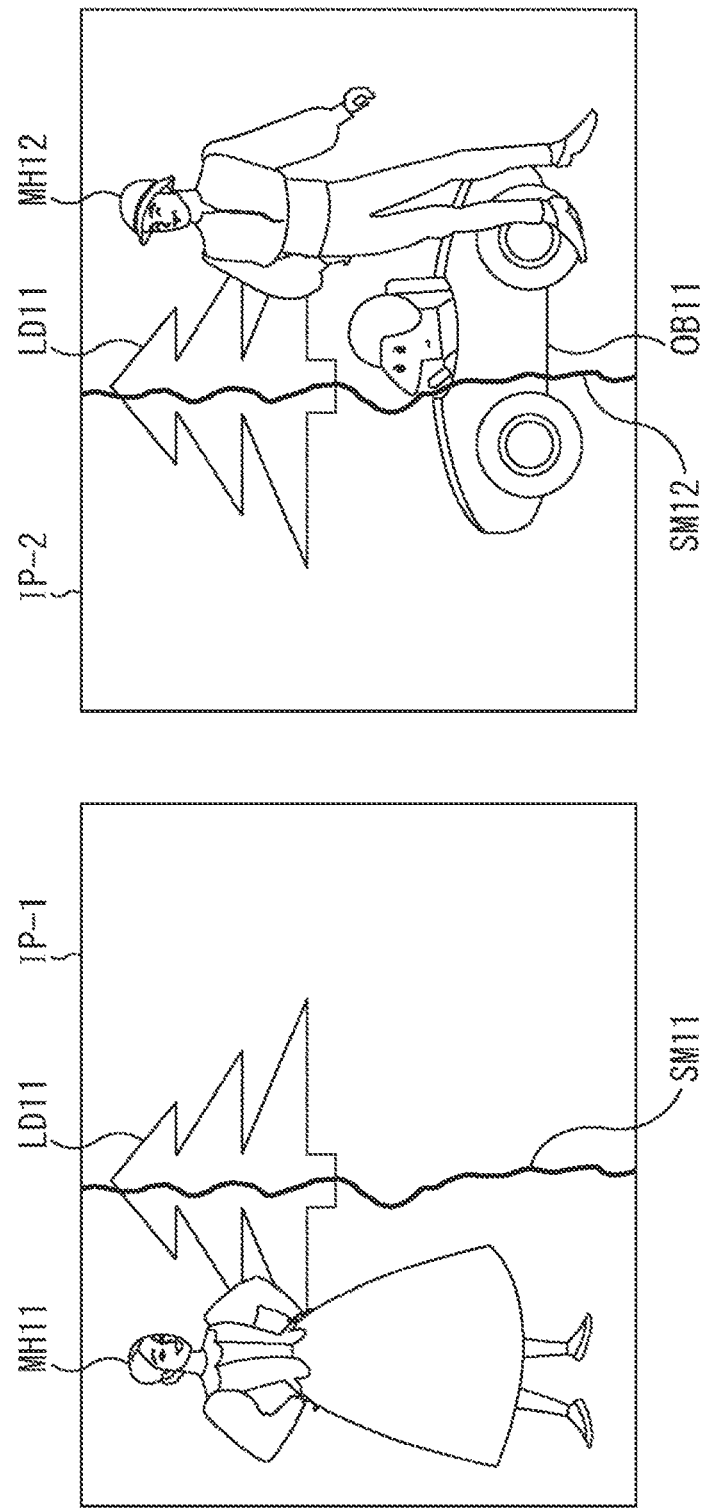
FIG. 17 is a diagram illustrating a seam.

For example, the dividing line output to the combining unit 23 may be taken to be the seam between the photographed images as illustrated in FIG. 17. Note that in FIG. 17, portions corresponding to the case in FIG. 2 are denoted with the same reference signs, and description thereof may be reduced or omitted as appropriate.

In FIG. 17, the seam SM11 on the first photographed image IP-1 and the seam SM12 on the second photographed image IP-2 illustrate a dividing line obtained by the seam determining process. If the photographed image IP-1 and the photographed image IP-2 are superimposed such that the same subjects overlap, these seams SM11 and SM12 will also overlap.

[Combining Process]

Next, the combining process that combines the first photographed image IP-1 and the second photographed image IP-2 to generate an output image OP will be described.

The combining process accepts two photographed images and a dividing line computed by the seam determining process, or in other words a seam, as input. More specifically, information obtained by the seam candidate region determining process and indicating whether to use the left side or the right side of the first photographed image during composition is also supplied.

For example, in the case where information indicating the use of the region on the left side of the first photographed image IP-1 is supplied, the combining process is performed using the first photographed image IP-1 for the region to the left of the input seam and using the second photographed image IP-2 for the region to the right of the seam.

In other words, the region to the left of the seam SM11 in the photographed image IP-1 as illustrated in FIG. 17 is joined to the region to the right of the seam SM12 in the photographed image IP-2 as illustrated in FIG. 17, for example, and the result is taken to be the output image OP.

Figure 18:
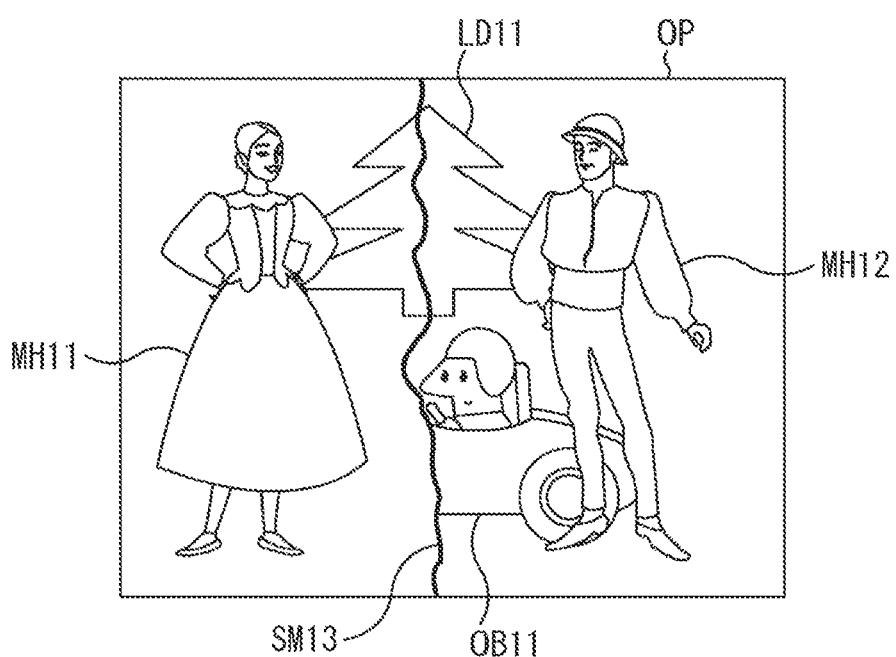
FIG. 18 is a diagram illustrating an example of an output image.

Thus, the output image OP illustrated in FIG. 18 is obtained, for example. Note that in FIG. 18, portions corresponding to the case in FIG. 1 are denoted with the same reference signs, and description thereof may be reduced or omitted.

The example in FIG. 18 demonstrates that a high-quality output image OP is obtained, and the primary subjects of the woman MH11 and the man MH12 are captured without being divided. However, in the output image OP, the automobile OB11 is divided by the seam SM 13.

Meanwhile, in the case where information indicating the use of the region on the right side of the first photographed image IP-1 is supplied, the combining process is performed using the first photographed image IP-1 for the region to the right of the input seam and using the second photographed image IP-2 for the region to the left of the seam.

[Supplement to center-penetrating Region Adding Process]

At this point, a supplementary description of the previously discussed center-penetrating region adding process will be given.

Figure 19:
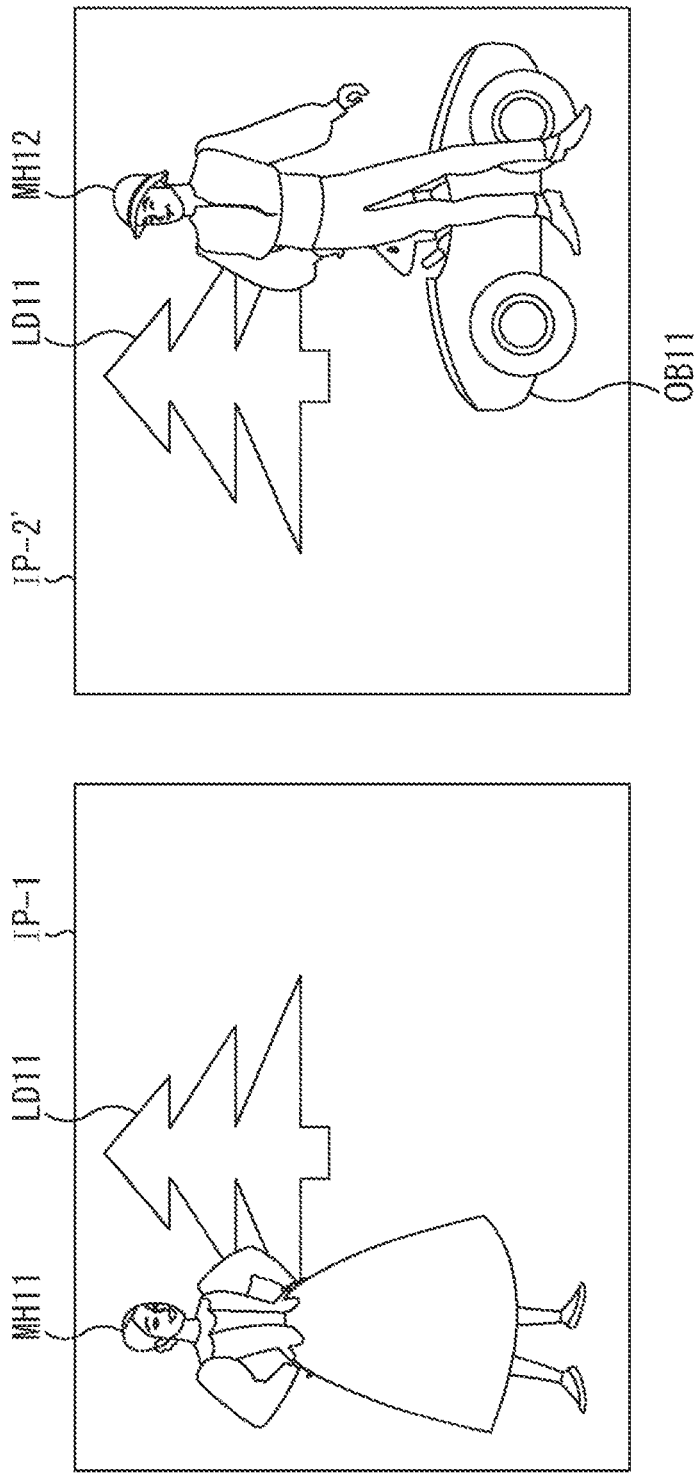
FIG. 19 is a diagram illustrating another example of photographed images.

For example, assume that the photographed images illustrated in FIG. 19 are input into the image processing apparatus 11 illustrated in FIG. 1. Note that in FIG. 19, portions corresponding to the case in FIG. 2 are denoted with the same reference signs, and description thereof may be reduced or omitted as appropriate.

In the example in FIG. 19, a first photographed image IP-1 and a second photographed image IP-2' have been input. The first photographed image IP-1 is the same as the photographed image IP-1 illustrated in FIG. 2. On the other hand, whereas the second photographed image IP-2' and the photographed image IP-2 illustrated in FIG. 2 capture the same subjects, the automobile OB11 among those subjects is captured at different positions. Specifically, the automobile OB11 in the photographed image IP-2' is positioned farther to the right than in the case of the photographed image IP-2.

Note that the photographed images IP-1 and IP-2' hereinafter will be designated simply the photographed images IP when not being particularly distinguished.

Figure 20:
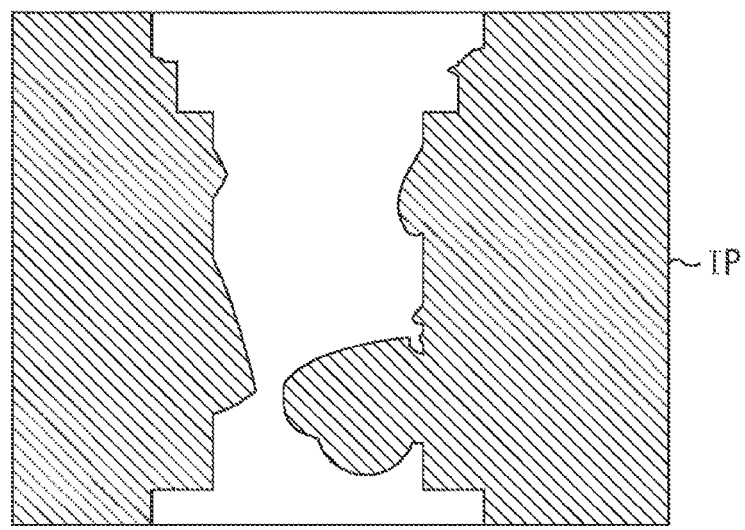
FIG. 20 is a diagram illustrating a seam candidate region.

When the image processing apparatus 11 performs the respective processes on these photographed images IP-1 and IP-2', the mask information output from the micro-region adder 39, or in other words the information indicating the mask region, becomes like that illustrated in FIG. 20.

In FIG. 20, the shaded region of the photographed images IP represents the mask region, while the unshaded region represents the seam candidate region.

In the mask region (shaded region) illustrated in FIG. 15, the regions corresponding to the woman MH11 and the automobile OB11 are contiguous. In contrast, in the mask region of FIG. 20, the regions corresponding to the woman MH11 and the automobile OB11 are not contiguous.

Figure 21:
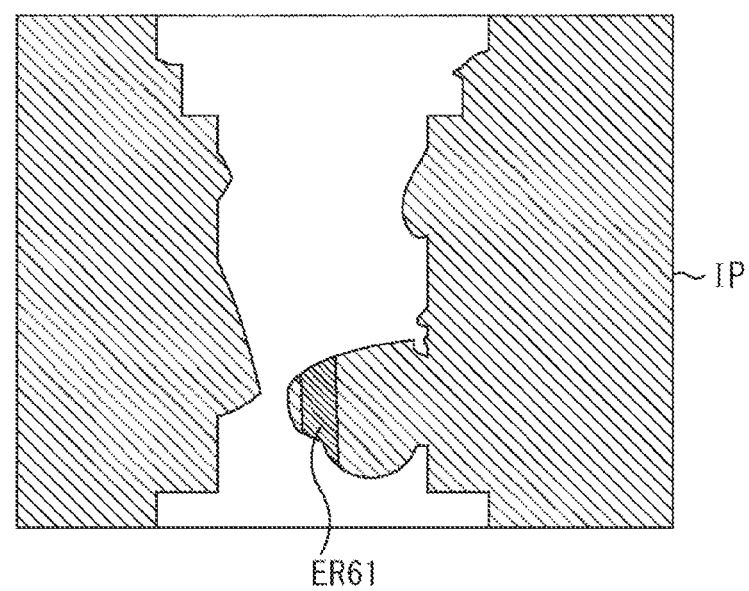
FIG. 21 is a diagram illustrating a center-penetrating region.

Also, in the case where the photographed images IP-1 and IP-2' are input, the center-penetrating region obtained by the center-penetrating region adding process becomes like that illustrated in FIG. 21.

In FIG. 21, the shaded region of the photographed images IP represents the mask region, while the unshaded region represents the seam candidate region. In addition, the region of the mask region on the photographed images IP that is positioned between the regions corresponding to the woman MH11 and the man MH12 is the center-penetrating region ER61.

Figure 22:
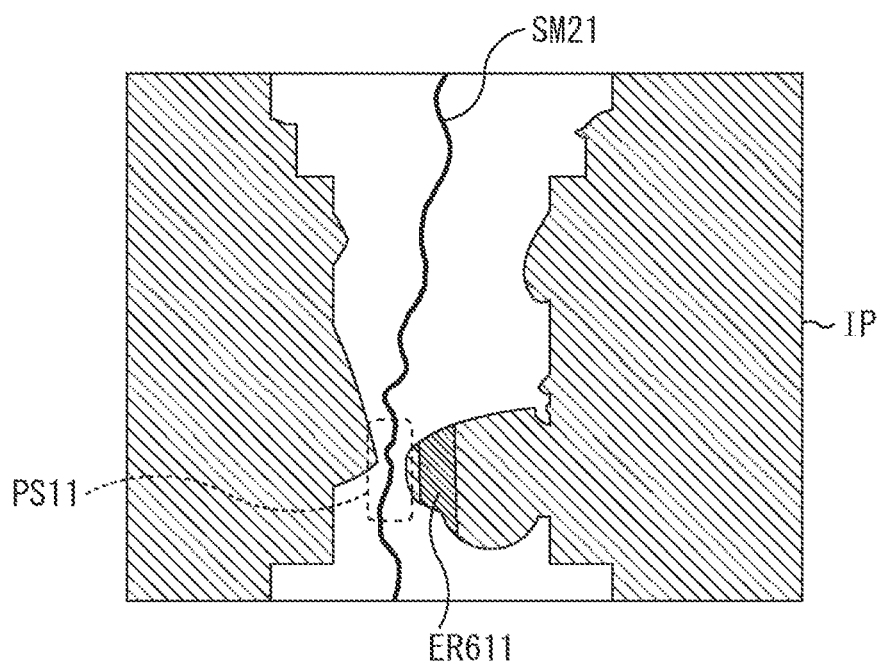
FIG. 22 is a diagram illustrating a seam.

In such a case, the seam determining process obtains the seam SM21 illustrated in FIG. 22 as the single line (dividing line) joining the top and bottom edges of the photographed images computed from the path that minimizes the total value of the pixels values for pixels in the difference map, or in other words, the seam.

In FIG. 22, the seam SM21 on the photographed images IP does not pass through the center-penetrating region ER61, but rather through a region PS11 between the shaded mask regions. The region PS11 is a region inside the seam candidate region.

Figure 23:
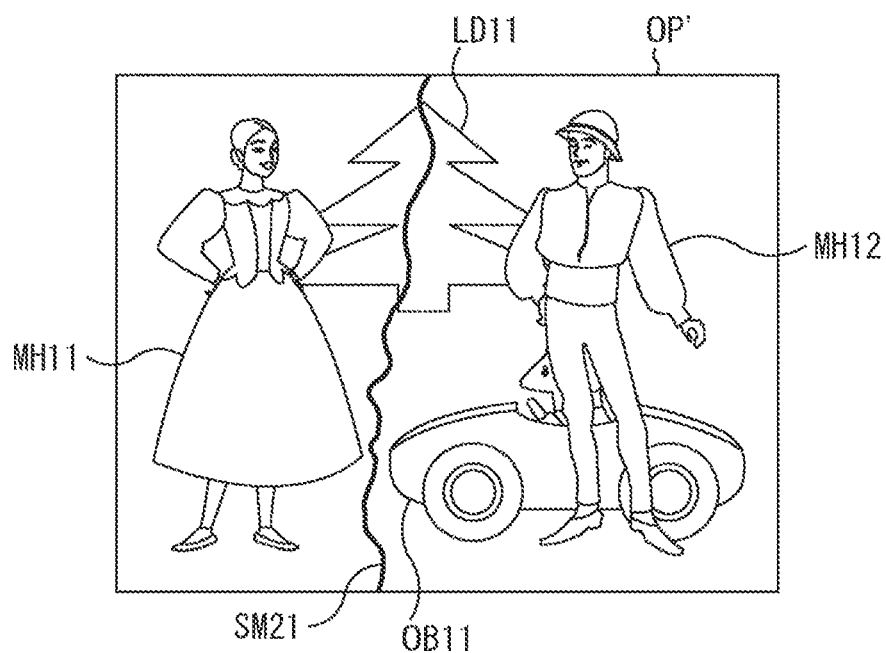
FIG. 23 is a diagram illustrating an example of an output image.

Also, if the photographed image IP-1 and the photographed image IP-2' are joined by the seam SM21, the output image OP' illustrated in FIG. 23 is obtained. Note that in FIG. 23, portions corresponding to the case in FIG. 22 or FIG. 18 are denoted with the same reference signs, and description thereof may be reduced or omitted as appropriate.

The output image OF in FIG. 23 demonstrates that not only the primary subjects of the woman MH11 and the man MH12 but also the automobile OB11 are captured without being divided.

Meanwhile, in the seam determining process, the region which is part of the shaded mask region in FIG. 22 but not the center-penetrating region ER61 has infinite energy. In other words, the pixel values of pixels in the difference map at the same positions as such a region take infinite values.

For this reason, among the shaded mask regions, the seam SM21 does not pass through regions which are not the center-penetrating region ER61. However, since the center-penetrating region ER61 has energy of finite value, or in other words since the pixel values of pixels in the difference map at the same positions as the center-penetrating region ER61 take finite values, it may be reasoned that there is a possibility of the seam SM21 passing through the center-penetrating region ER61.

However, values obtained by multiplying the difference values between the two photographed images IP by 1000 as discussed earlier are taken as the pixel values of pixels in the difference map corresponding to the center-penetrating region ER61. Consequently, if the seam SM21 passes through the center-penetrating region ER61, energy higher by a factor of 1000 is added, and thus passing through the region PS11 inside the seam candidate region incurs less energy than passing through the center-penetrating region ER61. In other words, a seam that passes through the region PS11 rather than passing through the center-penetrating region ER61 is computed as a result of the energy-minimizing dividing line detecting process.

In this way, the center-penetrating region, which is an undesirable region for the seam if it can be avoided, is not taken to be part of the seam region in the case where the center-penetrating region may be avoided just as in the example of FIG. 22, or in other words, in the case where the seam may pass through the region PS11.

Additionally, in cases where the center-penetrating region is unavoidable, as in the example of FIG. 16, the seam passes through the center-penetrating region ER51 which is undesirable for the seam if it can be avoided. The center-penetrating region computed by the center-penetrating region adding process is provided as suitable information to the subsequent seam determining process.

[Description of Image Combining Process]

Figure 24:
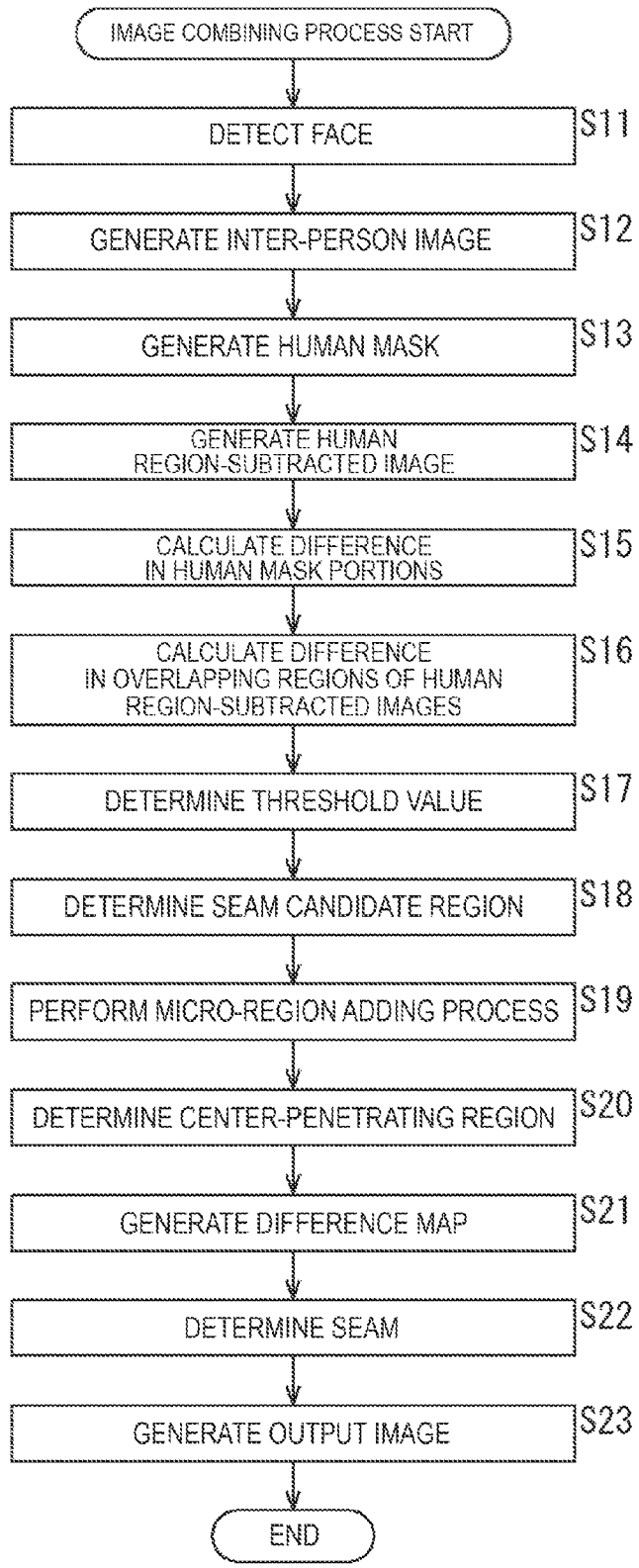
FIG. 24 is a flowchart illustrating an image combining process.

Next, the image combining process performed by the image processing apparatus 11 will be described with reference to the flowchart in FIG. 24. The image combining process is initiated when photographed images IP are supplied to the image processing apparatus 11 and instructions for generating an output image OP are issued.

In step S11, the face detectors 31 detect the facial regions of the persons given as subjects from the supplied photographed images IP.

For example, the face detector 31-1 detects the facial region of a human from the first photographed image IP-1, and supplies the detection result to the inter-person acquirer 32, the human mask generator 33, and the center-penetrating region adder 40. Also, the face detector 31-2 detects the facial region of a human from the second photographed image IP-2, and supplies the detection result to the inter-person acquirer 32, the human mask generator 33, and the center-penetrating region adder 40.

In step S12, the inter-person acquirer 32 generates an inter-person image on the basis of the supplied photographed images and the facial region detection results from the face detectors 31, and supplies the generated inter-person image to the human mask portion subtraction processor 34 and the human mask portion difference calculator 35.

For example, the inter-person acquirer 32 determines a dividing line that divides the facial regions detected from the photographed images IP through their centers, and takes the image in the region past the dividing line in a photographed image IP on the side towards the dividing line in the other photographed image IP to be the inter-person image. Thus, the inter-person image HP-1 and the inter-person image HP-2 in FIG. 5 are obtained, for example.

In step S13, the human mask generator 33 generates human masks indicating the regions of humans in the photographed images IP on the basis of the facial region detection results supplied from the face detectors 31, and supplies the generated human masks to the human mask portion subtraction processor 34 and the human mask portion difference calculator 35.

For example, the human mask generator 33 determines rectangular regions with respect to the facial regions on the photographed images IP which are positioned directly below the facial regions, with a size determined from the height and width of the facial regions, and takes the regions made up of the determined rectangular regions and facial regions to be human masks indicating human regions. Thus, the human mask MC11 and the human mask MC12 in FIG. 7 are obtained, for example.

In step S14, the human mask portion subtraction processor 34 generates human region-subtracted images on the basis of the inter-person images from the inter-person acquirer 32 and the human masks from the human mask generator 33, and supplies the generated human region-subtracted images to the background portion difference calculator 36 and the subtraction processor 38.

For example, the human mask portion subtraction processor 34 takes the images in the remaining regions after removing the human mask regions from the inter-person images as human region-subtracted images. Thus, the human region-subtracted image HRP-1 and the human region-subtracted image HRP-2 in FIG. 8 are obtained, for example.

In step S15, the human mask portion difference calculator 35 calculates the differences between the human masks in the inter-person images on the basis of the inter-person images from the inter-person acquirer 32 and the human masks from the human mask generator 33, and supplies the calculated differences to the threshold value determining unit 37.

In other words, the human mask portion difference calculator 35 calculates the difference between a human region in one of the two inter-person images and a region in the other inter-person image corresponding to that human region for each pixel inside those regions. Thus, differences are calculated between the pixel values of the pixels at the same positions in the region DF11 and the region DF13, and between the pixel values of the pixels at the same positions in the region DF12 and the region DF14 of FIG. 9, for example. In other words, the differences between the human regions and the background regions are calculated.

In step S16, the background portion difference calculator 36 calculates differences between the overlapping regions in the two human region-subtracted images supplied from the human mask portion subtraction processor 34, and supplies the calculation results to the subtraction processor 38. With this process, differences are calculated between the pixel values of the pixels at the same positions in the region UR11 and the region UR12 of FIG. 10, for example. Thus, the differences between approximate background regions themselves are obtained.

In step S17, the threshold value determining unit 37 determines a threshold value by performing a threshold value determining process on the basis of the difference calculation results supplied from the human mask portion difference calculator 35, and supplies the determined threshold value to the subtraction processor 38.

In other words, the threshold value determining unit 37 generates, on the basis of the differences supplied from the human mask portion difference calculator 35, a cumulative histogram of pixels whose differences were computed, and takes the difference value at a given cumulative number of pixels in the obtained cumulative histogram to be the threshold value. Thus, the cumulative histogram HG11 of FIG. 11 is generated, and the difference value TH11 at the position PX13 is taken to be the threshold value, for example.

In step S18, the subtraction processor 38 uses the differences from the background portion difference calculator 36 and the threshold value from the threshold value determining unit 37 to determine a seam candidate region from the human region-subtracted images supplied from the human mask portion subtraction processor 34, and supplies the determined seam candidate region to the micro-region adder 39.

For example, the subtraction processor 38 computes the regions where the human region-subtracted images overlap (overlapping regions) in the case where the first and second human region-subtracted images are superimposed such that the same subjects overlap. The subtraction processor 38 then takes the seam candidate region to be the regions from among the overlapping regions which are made up of pixels for which the difference between pixels in the two human region-subtracted images is less than the threshold value to be the seam candidate region. According to this process, the unshaded regions inside the region UR21 of FIG. 12 are determined as the seam candidate region, for example.

In step S19, the micro-region adder 39 performs the micro-region adding process on the seam candidate region supplied from the subtraction processor 38. The micro-region adder 39 then supplies mask information specifying the final seam candidate region obtained by the micro-region adding process to the center-penetrating region adder 40 and the difference calculator 51.

In other words, in the micro-region adding process, the seam candidate region is dilated to correct the seam candidate region. Thus, the unshaded regions illustrated in FIG. 15 are obtained as the seam candidate region, for example. Additionally, the shaded regions illustrated in FIG. 15, or in other words the regions which are not the seam candidate region, are taken to be the mask regions, and mask information indicating the mask regions is output as information specifying the seam candidate region, for example.

In step S20, the center-penetrating region adder 40 determines a center-penetrating region on the basis of the face detection results from the face detectors 31 and the mask information from the micro-region adder 39, and supplies the determined center-penetrating region to the difference calculator 51.

In other words, the center-penetrating region adder 40 takes the center-penetrating region to be a region which is part of the mask regions in the photographed images IP and which exists in the approximate middle between the dividing lines of the two facial regions detected by the face detectors 31. Thus, the center-penetrating region ER51 of FIG. 16 is obtained, for example.

In step S21, the difference calculator 51 generates a difference map on the basis of the supplied photographed images IP, the mask information from the micro-region adder 39, and the center-penetrating region from the center-penetrating region adder 40, and supplies the generated difference map to the dividing line detector 52.

For example, the difference calculator 51 takes the pixel values of pixels in the difference map about to be generated to be the difference values between the pixel values of pixels in the two photographed images IP at the same positions as those pixels. Then, for pixels in the difference map which exist at the same positions as the center-penetrating region, the difference calculator 51 takes values obtained by applying gain to the pixel values of the pixels in that difference map to be the final pixel values.

In addition, for pixels in the difference map which exist at the same positions as regions which are part of neither the seam candidate region nor the center-penetrating region in the photographed images, the difference calculator 51 takes the pixel values of such pixels to have infinite values, and takes the difference map obtained as a result to be the final difference map.

In step S22, the dividing line detector 52 determines a seam between the photographed images IP on the basis of the difference map supplied from the difference calculator 51, and supplies the determined seam to the combining unit 23.

For example, the dividing line detector 52 computes a dividing line by computing, from among arbitrary paths from the top edge to the bottom edge of the difference map, the path that minimizes the total value of the pixel values of the pixels along the path, and taking the line on the photographed images that passes through the same positions as that path to be the seam between the photographed images. Thus, the seam SM11 and the seam SM12 of FIG. 17 are obtained, for example.

In step S23, the combining unit 23 combines the supplied two photographed images IP at the position of the seam supplied from the dividing line detector 52, and generates an output image OP. Thus, the output image OP illustrated in FIG. 18 is obtained, for example.

Once an output image is obtained, the combining unit 23 outputs the generated output image, and the image combining process ends.

As above, the image processing apparatus 11 takes the region obtained by subtracting human regions from photographed images to be a seam candidate region, and uses the seam candidate region to generate a difference map indicating the energies when determining a seam. The image processing apparatus 11 then determines a seam on the basis of the difference map, combines the photographed images with that seam, and takes the result to be the output image.

By using a difference map in this way, it is possible to easily determine a suitable seam that does not pass through human regions, and in so doing, suitably combine images with a simple process.

<Second Exemplary Embodiment>
[Difference Calculating Process]

Next, a second exemplary embodiment of the present technology will be described.

The second exemplary embodiment differs from the first exemplary embodiment discussed above only in part of the difference calculating process included in the seam determining process, or in other words, only in the process performed by the difference calculator 51. Thus, hereinafter this difference calculating process will be described.

As discussed earlier, mask information for specifying the seam candidate region illustrated in FIG. 15 that is computed by the seam candidate region determining process is information for specifying the region obtained by subtracting approximate human portions and leaving approximate background portions. This is not information on the region obtained by precisely subtracting human portions and precisely leaving background portions.

The difference between the first exemplary embodiment and the second exemplary embodiment lies in the meaning imparted by "approximately" and not "precisely".

In the first exemplary embodiment discussed earlier, infinite values are set for the pixel values of pixels in the difference map corresponding to the removed mask region not taken to be the seam candidate region and indicated by the mask information in FIG. 15, in order to completely subtract the mask region from the region taken to be the seam.

However, since the mask information is not precise, it may not be desirable to completely subtract the mask region from the region taken to be the seam. Thus, in the second exemplary embodiment, a large gain is applied instead of infinite values to the pixel values in the difference map at the boundary vicinity portions of the removed mask region not taken to be the seam candidate region and indicated by the mask information. In so doing, the mask region is not completely subtracted to disallow the seam to pass through, but instead, the seam is made to not pass through the mask region wherever possible.

Specifically, from the mask region indicated by the mask information obtained by the seam candidate region determining process, an erosion process is performed on a region obtained by excluding a region that is undesirable as the seam if avoidable.

Herein, the mask region is the shaded region in FIG. 15, for example, and the region that is undesirable as the seam if avoidable refers to the center-penetrating region ER51 in FIG. 16, for example.

Also, the erosion magnitude is approximately 8 pixels, for example. This eroded region is designated the first erosion region.

Furthermore, the first erosion region is once again eroded, and the eroded region at this point is designated the second erosion region.

Figure 25:
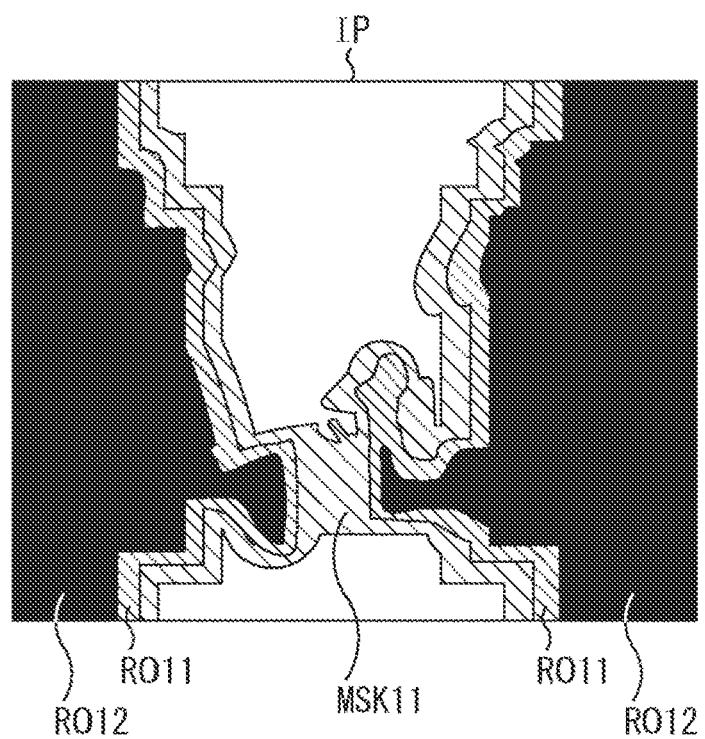
FIG. 25 is a diagram illustrating differential map generation.

For example, if erosion is applied to the region obtained by excluding the center-penetrating region ER51 from the mask region illustrated in FIG. 15, or in other words, from the shaded region, the result becomes like that illustrated in FIG. 25.

In FIG. 25, the unshaded region of the photographed images IP represents the seam candidate region specified by the mask information. Also, part of the shaded region is the mask region MSK11. Additionally, the region adjacent to the mask region MSK11 is the first erosion region RO11, and the region adjacent to the first erosion region RO11 is the second erosion region RO12.

In this exemplary embodiment, first, the difference calculator 51 performs the difference calculating process to apply the above erosion twice and compute the first and second erosion regions.

Then, in the difference calculating process, difference values between the photographed images are forcibly set to infinite values at positions inside the region which is both part of the second erosion region but not part of the region that is undesirable as the seam if avoidable (the center-penetrating region). In other words, the pixel values are set to infinite values for the pixels inside the region of the difference map that corresponds to a region that is part of the second erosion region but not part of the center-penetrating region.

In addition, a gain having a given magnitude (a value equal to or greater than 1, such as 20, for example) is applied to the difference values between the photographed images at positions inside a region that is part of the first erosion region but not part of the second erosion region and not part of the center-penetrating region.

In other words, provided that the target region is the region of the difference map corresponding to a region that is part of the first erosion region but not part of the second erosion region and not part of the center-penetrating region, gain is applied to the difference values between the photographed images at each position in the target region. The pixel values of pixels inside the region of the difference map corresponding to the target region are then taken to be the values of the difference values with applied gain at the positions inside the target region at the same positions as those pixels.

Furthermore, a gain having a given magnitude (a value equal to or greater than 1, such as 10, for example) is applied to the difference values between the photographed images at positions inside a region that is part of the removed region not taken to be the seam candidate region, or in other words the mask region, but not part of the first erosion region, not part of the second erosion region, and not part of the center-penetrating region.

In other words, provided that the target region is a region that is part of the mask region but part of neither the first erosion region, the second erosion region, nor the center-penetrating region, gain is applied to the difference values between the photographed images at each position in the target region. The pixel values of pixels inside the region of the difference map corresponding to the target region are then taken to be the values of the difference values with applied gain at the positions inside the target region at the same positions as those pixels. The gain applied at this point is set to a smaller value than the gain applied to the first erosion region.

Also, in the seam candidate region, the difference values between the two photographed images are set as-is. In other words, the pixel values of pixels in the seam candidate region at the same positions as pixels inside the region of the difference map corresponding to the seam candidate region are simply taken to be the pixel values of the pixels in the difference map.

Thus, a difference map having five properties like the following is obtained.

Property 1: The pixel values of pixels in the difference map corresponding to a region that is part of the second erosion region, but not part of the center-penetrating region, have infinite values.

Property 2: The pixel values of pixels in the difference map corresponding to a region that is part of the first erosion region, but part of neither the second erosion region nor the center-penetrating region, have large values (values equal to 20 times the difference values, for example).

Property 3: The pixel values of pixels in the difference map corresponding to a region that is part of the region subtracted from the seam candidate region (the mask region), but part of neither the first erosion region, the second erosion region, nor the center-penetrating region, have somewhat large values (values equal to 10 times the difference values, for example).

Property 5: The pixel values of pixels in the difference map corresponding to the center-penetrating region have very large values (values equal to 1000 times the difference values, for example).

Property 5: The pixel values of pixels in the difference map corresponding to other regions, or in other words the seam candidate region, take small values at pixels where the difference between the two photographed images at a particular pixel position is small, and take large values at pixels where the difference between the two photographed images is large.

In the difference calculating process, the difference calculator 51 generates a difference map having the above properties 1 to 5, and supplies the generated difference map to the dividing line detector 52. Consequently, in this case, a difference map having the properties 1 to 5 is generated by the difference calculator 51 in step S21 of FIG. 24.

By generating a difference map as above, it is possible to provide as a candidate for the energy-minimizing dividing line detecting process, a single line joining the top and bottom edges of an image in which the region subtracted from the seam candidate region that was obtained by the seam candidate region determining process, or in other words the mask region, is partially eroded. Consequently, the seam between the photographed images IP is substantially computed as follows.

Namely, a line that passes through the top edge and the bottom edge of the seam candidate region and divides the seam candidate region (in other words, a dividing line) is computed as the seam. At this point, a dividing line may be computed with a parameter specifying that the dividing line pass through only the seam candidate region as much as possible, but allowing the dividing line to pass through the first erosion region, part of the mask region, and the center-penetrating region in cases where the above such dividing line is not obtained.

However, the dividing line is made to pass through the first erosion region more than the center-penetrating region. In addition, the dividing line is made to pass through a region that is part of neither the center-penetrating region in the mask region, the first erosion region, nor the second erosion region more than the first erosion region. Furthermore, the dividing line does not pass through the second erosion region.

Note that although the above describes applying erosion twice, the number of times to apply erosion may also be one time, and may also be three or more times.

Also, the processing in the seam candidate region determining process occupies a large proportion of the overall processing load in the image combining process discussed in the foregoing. Thus, this portion may also be configured to perform a process to generate and process reduced images, and then enlarge the resulting mask information to the size of the original images. In so doing, it becomes possible to reduce the processing load in the seam candidate region determining process.

Furthermore, although the foregoing describes combining photographed images such that two users given as the primary subjects are included in the output image, the primary subjects are not limited to being humans, and may be any subjects. For example, if the subjects are detectable by a technique such as object recognition, it is possible to generate an output image with those subjects in the foreground.

In this case, a first photographed image including a first foreground object given as a primary subject and a background is combined with a second photographed image including a second foreground object given as a primary subject and the background, and an output image including the first foreground object, the second foreground object, and the background is generated.

The series of processes described above can be executed by hardware but can also be executed by software. When the series of processes is executed by software, a program that constructs such software is installed into a computer. Here, the expression "computer" includes a computer in which dedicated hardware is incorporated and a general-purpose personal computer or the like that is capable of executing various functions when various programs are installed.

Figure 26:
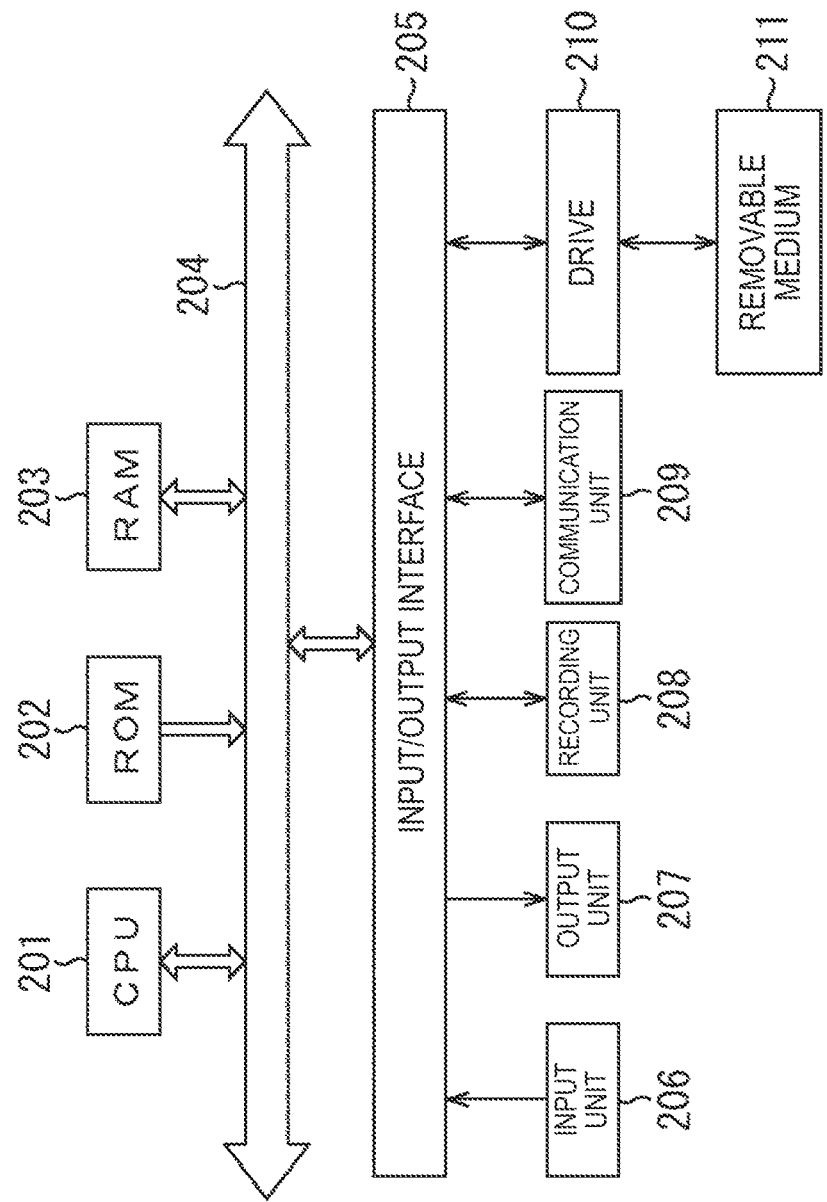
FIG. 26 is a diagram illustrating an exemplary configuration of a computer.

FIG. 26 is a block diagram showing an example configuration of the hardware of a computer that executes the series of processes described earlier according to a program.

In the computer, a central processing unit (CPU) 201, a read only memory (ROM) 202 and a random access memory (RAM) 203 are mutually connected by a bus 204.

An input/output interface 205 is also connected to the bus 204. An input unit 206, an output unit 207, a storage unit 208, a communication unit 209, and a drive 210 are connected to the input/output interface 205.

The input unit 206 is configured from a keyboard, a mouse, a microphone, an imaging device, or the like. The output unit 207 configured from a display, a speaker or the like. The storage unit 208 is configured from a hard disk, a non-volatile memory or the like. The communication unit 209 is configured from a network interface or the like. The drive 210 drives a removable media 211 such as a magnetic disk, an optical disk, a magneto-optical disk, a semiconductor memory or the like.

In the computer configured as described above, the CPU 201 loads a program that is stored, for example, in the storage unit 208 onto the RAM 203 via the input/output interface 205 and the bus 204, and executes the program. Thus, the above-described series of processing is performed.

Programs to be executed by the computer (the CPU 201) are provided being recorded in the removable media 211 which is a packaged media or the like. Also, programs may be provided via a wired or wireless transmission medium, such as a local area network, the Internet or digital satellite broadcasting.

In the computer, by inserting the removable media 211 into the drive 210, the program can be installed in the storage unit 208 via the input/output interface 205. Further, the program can be received by the communication unit 209 via a wired or wireless transmission media and installed in the storage unit 208. Moreover, the program can be installed in advance in the ROM 202 or the storage unit 208.

It should be noted that the program executed by a computer may be a program that is processed in time series according to the sequence described in this specification or a program that is processed in parallel or at necessary timing such as upon calling.

It should be understood by those skilled in the art that various modifications, combinations, sub-combinations and alterations may occur depending on design requirements and other factors insofar as they are within the scope of the appended claims or the equivalents thereof.

For example, the present disclosure can adopt a configuration of cloud computing which processes by allocating and connecting one function by a plurality of apparatuses through a network.

Further, each step described by the above mentioned flow charts can be executed by one apparatus or by allocating a plurality of apparatuses.

In addition, in the case where a plurality of processes is included in one step, the plurality of processes included in this one step can be executed by one apparatus or by allocating a plurality of apparatuses.

Additionally, the present technology may also be configured as below.
(1) An image processing apparatus that combines a first photographed image including a first foreground object and a background with a second photographed image including a second foreground object and the background, and generates an output image including the first foreground object, the second foreground object, and the background, the image processing apparatus including:
  a seam candidate region determining unit that determines a seam candidate region obtained by removing regions of the first foreground object and the second foreground object from the first photographed image or the second photographed image;
  a seam determining unit that determines a seam which passes through a top edge and a bottom edge of the seam candidate region and divides the seam candidate region; and
  a combining unit that combines the first photographed image and the second photographed image at the seam to generate the output image.

(2) The image processing apparatus according to (1),
  wherein the seam candidate region determining unit includes
    a foreground region determining unit that detects, as a foreground region, the region of the first foreground object or the second foreground object in the first photographed image or the second photographed image,
    a foreground difference calculator that calculates a difference between the foreground region in the image of one of either the first photographed image or the second photographed image, and the region in the other image corresponding to the foreground region,
    a threshold value determining unit that determines a threshold value on the basis of the difference calculated by the foreground difference calculator,
    a background difference calculator that calculates a difference between the first photographed image and the second photographed image in a region excluding the foreground region, and
    a threshold value processor that determines the seam candidate region on the basis of the difference calculated by the background difference calculator and the threshold value.

(3) The image processing apparatus according to (2),
  wherein the threshold value processor sets, as the seam candidate region, a region obtained by subtracting a region where the difference is equal to or greater than the threshold value from the region whose difference has been calculated by the background difference calculator.

(4) The image processing apparatus according to any one of (1) to (3),
  wherein the seam candidate region determining unit further includes a center-penetrating region determining unit that determines, as a center-penetrating region, a region in the first photographed image or the second photographed image which differs from the seam candidate region, and which is positioned between the first foreground object and the second foreground object;
  wherein, in a case where the seam that passes through only the seam candidate region is not obtained, the seam determining unit determines the seam under condition that the seam is allowed to pass through the center-penetrating region.

(5) The image processing apparatus according to (4),
  wherein the seam determining unit performs a region erosion process on a region in the first photographed image or the second photographed image that differ from the seam candidate region and the center-penetrating region, and in a case where a seam that passes through only the seam candidate region is not obtained, the seam determining unit determines the seam under condition that the seam is allowed to pass through the region eroded by the region erosion process.

The present disclosure contains subject matter related to that disclosed in Japanese Priority Patent Application JP 2012-072788 filed in the Japan Patent Office on Mar. 28, 2012, the entire content of which is hereby incorporated by reference.

What is claimed is:

1. An image processing apparatus that combines a first photographed image including a first foreground object and a background with a second photographed image including a second foreground object and the background, and generates an output image including the first foreground object, the second foreground object, and the background, the image processing apparatus comprising:
  a seam candidate region determining unit that determines a seam candidate region obtained by removing regions of the first foreground object and the second foreground object from the first photographed image or the second photographed image;
  a seam determining unit that determines a seam which passes through a top edge and a bottom edge of the seam candidate region and divides the seam candidate region; and
  a combining unit that combines the first photographed image and the second photographed image at the seam to generate the output image.

2. The image processing apparatus according to claim 1,
  wherein the seam candidate region determining unit includes
    a foreground region determining unit that detects, as a foreground region, the region of the first foreground object or the second foreground object in the first photographed image or the second photographed image,
    a foreground difference calculator that calculates a difference between the foreground region in the image of one of either the first photographed image or the second photographed image, and the region in the other image corresponding to the foreground region,
    a threshold value determining unit that determines a threshold value on the basis of the difference calculated by the foreground difference calculator,
    a background difference calculator that calculates a difference between the first photographed image and the second photographed image in a region excluding the foreground region, and
    a threshold value processor that determines the seam candidate region on the basis of the difference calculated by the background difference calculator and the threshold value.

3. The image processing apparatus according to claim 2,
  wherein the threshold value processor sets, as the seam candidate region, a region obtained by subtracting a region where the difference is equal to or greater than the threshold value from the region whose difference has been calculated by the background difference calculator.

4. The image processing apparatus according to claim 1,
  wherein the seam candidate region determining unit further includes a center-penetrating region determining unit that determines, as a center-penetrating region, a region in the first photographed image or the second photographed image which differs from the seam candidate region, and which is positioned between the first foreground object and the second foreground object;
  wherein, in a case where the seam that passes through only the seam candidate region is not obtained, the seam determining unit determines the seam under condition that the seam is allowed to pass through the center-penetrating region.

5. The image processing apparatus according to claim 4, wherein the seam determining unit performs a region erosion process on a region in the first photographed image or the second photographed image that differ from the seam candidate region and the center-penetrating region, and in a case where a seam that passes through only the seam candidate region is not obtained, the seam determining unit determines the seam under condition that the seam is allowed to pass through the region eroded by the region erosion process.

6. An image processing method that combines a first photographed image including a first foreground object and a background with a second photographed image including a second foreground object and the background, and generates an output image including the first foreground object, the second foreground object, and the background, the image processing method comprising:

determining a seam candidate region obtained by removing regions of the first foreground object and the second foreground object from the first photographed image or the second photographed image;

determining a seam which passes through a top edge and a bottom edge of the seam candidate region and divides the seam candidate region; and combining the first photographed image and the second photographed image at the seam to generate the output image.

7. A nontransitory computer readable medium on which is stored an image processing program that combines a first photographed image including a first foreground object and a background with a second photographed image including a second foreground object and the background, and generates an output image including the first foreground object, the second foreground object, and the background, the image processing program causing a computer to execute the processes of:

determining a seam candidate region obtained by removing regions of the first foreground object and the second foreground object from the first photographed image or the second photographed image;

determining a seam which passes through a top edge and a bottom edge of the seam candidate region and divides the seam candidate region; and combining the first photographed image and the second photographed image at the seam to generate the output image.

\* \* \* \* \*